(12) United States Patent
Motonishi et al.

(10) Patent No.: US 7,643,249 B2
(45) Date of Patent: Jan. 5, 2010

(54) SUPPORTING MECHANISM FOR MAGNETIC HEAD SLIDER AND TESTING METHOD FOR THE MAGNETIC HEAD SLIDER

(75) Inventors: Michiharu Motonishi, Niigata-ken (JP); Kanji Sawai, Niigata-ken (JP)

(73) Assignee: TDK Corporation, Tokyo (JP)

( * ) Notice: Subject to any disclaimer, the term of this patent is extended or adjusted under 35 U.S.C. 154(b) by 446 days.

(21) Appl. No.: 11/218,882

(22) Filed: Aug. 26, 2005

(65) Prior Publication Data

US 2006/0072245 A1     Apr. 6, 2006

(30) Foreign Application Priority Data

Oct. 4, 2004     (JP) ............................. 2004-291562

(51) Int. Cl.
*G11B 21/20*     (2006.01)

(52) U.S. Cl. ............... 360/234.5; 360/234.6; 360/245.9

(58) Field of Classification Search .............. 360/234.6, 360/245.9, 234.5
See application file for complete search history.

(56) References Cited

U.S. PATENT DOCUMENTS

| | | | |
|---|---|---|---|
| 5,079,659 A | 1/1992 | Hagen | |
| 5,757,585 A | 5/1998 | Aoyagi et al. | |
| 6,163,438 A | 12/2000 | Kajitani | |
| 6,229,673 B1 * | 5/2001 | Shinohara et al. | 360/246.2 |
| 6,690,551 B2 | 2/2004 | Shiraishi et al. | |
| 6,829,818 B2 | 12/2004 | Kamigama et al. | |
| 6,956,724 B2 | 10/2005 | Shiraishi et al. | |
| 2006/0176615 A1 | 8/2006 | Nakazawa | |

FOREIGN PATENT DOCUMENTS

| | | |
|---|---|---|
| JP | 60-12865 | 1/1985 |
| JP | 02-260181 | 10/1990 |
| JP | 3-5981 | 1/1991 |
| JP | 05-166317 | 7/1993 |
| JP | 5-79763 | 10/1993 |
| JP | 6-4456 | 2/1994 |
| JP | 6-203507 | 7/1994 |
| JP | 07-057417 | 3/1995 |
| JP | 9-213036 | 8/1997 |
| JP | 09-251627 | 9/1997 |
| JP | 10-055641 | 2/1998 |
| JP | 2002-150734 | 5/2002 |
| JP | 2003-016616 | 1/2003 |
| WO | WO 02/100156 A2 | 12/2002 |

OTHER PUBLICATIONS

Copy of search report for Chinese Patent Application No. 2005100640121.
Office Action issued in corresponding Japanese Patent Application No. 2004-291562; issued Sep. 2, 2008.
Office Action issued in related Japanese Patent Application No. 2005-032153; issued Jun. 5, 2007.

* cited by examiner

*Primary Examiner*—A. J. Heinz
(74) *Attorney, Agent, or Firm*—Brinks Hofer Gilson & Lione

(57) ABSTRACT

A holding portion, on which a slider having a magnetic element for recording and/or replaying is held is provided on a second supporting portion of a supporting member, in which conductive patterns are formed. A plurality of fixing portions are formed in the holding portion and when the slider is sandwiched between the plurality of fixing portions, the slider is electrically connected with the conductive patterns.

17 Claims, 19 Drawing Sheets

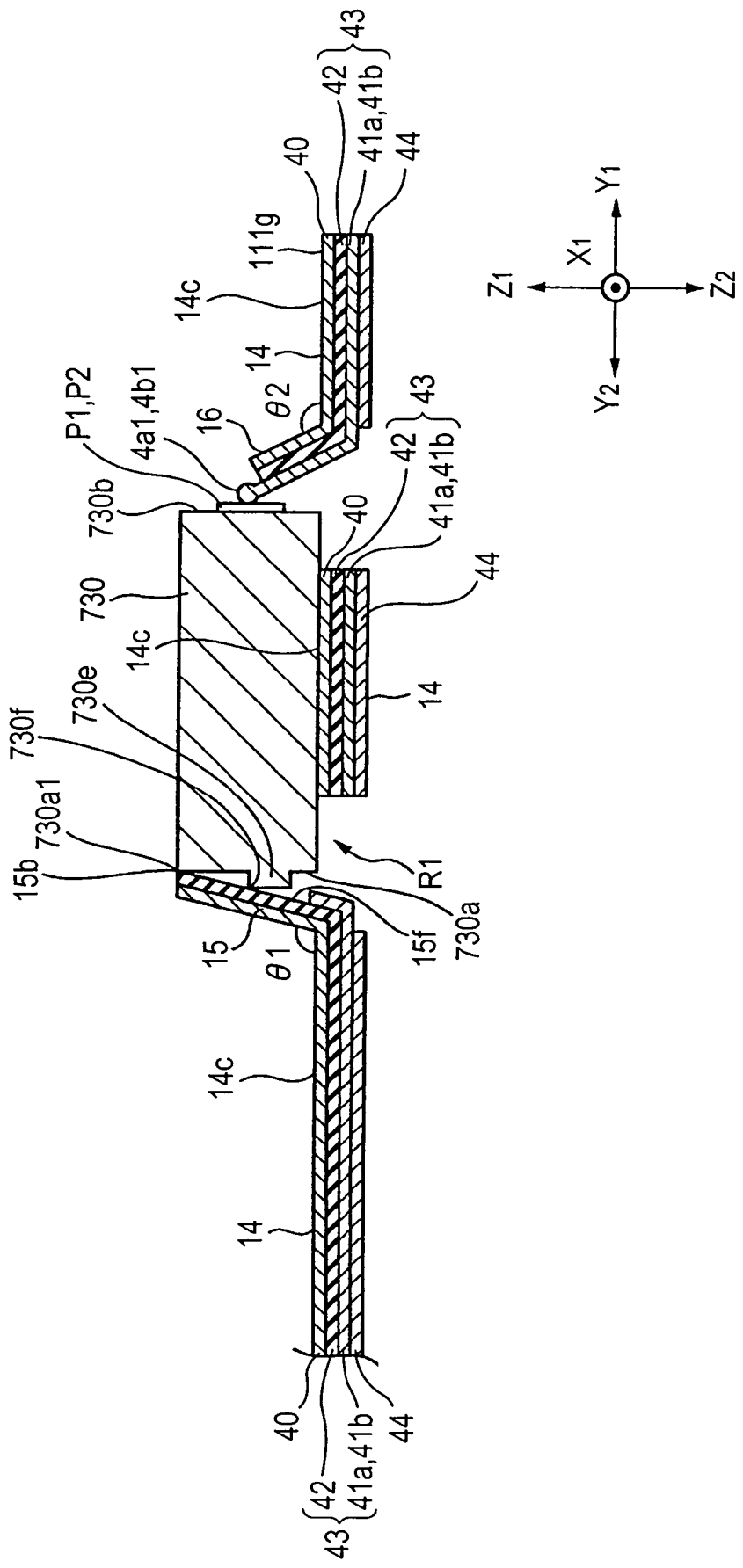

SUPPORTING MECHANISM FOR MAGNETIC HEAD SLIDER AND TESTING METHOD FOR THE MAGNETIC HEAD SLIDER

This application claims the benefit of priority to Japanese Patent Application No. 2004-291562 filed on Oct. 4, 2004, herein incorporated by reference.

BACKGROUND OF THE INVENTION

1. Field of the Invention

The present invention relates to a supporting member for supporting a slider in which a magnetic element is formed, and more particularly to a supporting member with high versatility capable of realizing a good electric connection between an electric circuit formed in the supporting member and the slider, and efficiently performing a process for holding the slider with ease, and the present invention further relates to a testing method for a magnetic element using the supporting member, and more particularly to a testing method for the magnetic element capable of testing dynamic electrical characteristics of the slider before the slider is assembled with a flexure or a load beam.

2. Description of the Related Art

In FIGS. 1 and 9 in Japanese Unexamined Patent Application Publication No. 9-213036, described below, a suspension 3 that functions as a supporting member for supporting a slider 4 in which a magnetic element is formed is disclosed. The suspension 3 is that of an integrated-wiring type, provided with gimbal portions 3b, 3b'. A slider-mounting portion 3a is formed in the gimbal portions 3b, 3b' of the suspension 3 and an upper face of the slider 4 is bonded to be fixed onto an upper face of the slider-mounting portion 3a. The slider 4 is thereby supported by the suspension 3. Accordingly, the suspension 3 and the slider 4 constitute a head gimbal assembly (HGA).

The suspension 3 disclosed in Japanese Unexamined Patent Application Publication No. 9-213036 is provided with an electrode 13 on the suspension 3 formed at an upper face of the slider-mounting portion 3a and a lead wire 1 electrically connected to the electrode 13. Further, the lead wire 1 is configured to be upwardly rising up (in a direction toward the slider 4) from the upper face of the slider-mounting portion 3a. In addition, the head gimbal assembly (HGA) is formed by electrically connecting the lead wire 1 with the electrode 12 on the slider 4, formed at a trailing-side end face of the slider 4 by being ultrasonically bonded under heating. On the other hand, no member is brought into contact with a leading-side end face of the slider 4 resulting in forming an open-end face.

Furthermore, in Japanese Unexamined Patent Application Publication No. 6-203507, a head gimbal assembly (HGA) composed of a magnetic head slider 1 including a core chip 2 and a supporting spring 4 that functions as a supporting member for supporting the magnetic head slider 1 are disclosed.

A supporting spring fixing groove 3 is formed at a side-face of the magnetic head slider 1 that constitutes the head gimbal assembly (hereinafter referred to as HGA).

Furthermore, at a tip end portion of the supporting spring 4 that constitutes the HGA, a hooking concave portion 4a having an open-end is formed and at both sides of the hooking concave portion 4a, a pair of right and left fitting convex pieces 4b are formed.

In the head gimbal assembly (HGA) disclosed in Japanese Unexamined Patent Application Publication No. 6-203507, the magnetic head slider 1 is inserted from the open-end side into the hooking concave portion 4a formed in the supporting spring 4 and hooked therewith. In addition, a pair of right and left fitting convex pieces 4b formed in the supporting spring 4 fit into the supporting spring fixing groove 3 from both sides thereof and in this state, the magnetic head slider 1 is hooked at the hooking concave portion 4a formed in the supporting spring 4. Further, the magnetic head slider 1 is fixed to the supporting spring 4 through a bonding means, such as epoxide resin or the like formed in the supporting spring fixing groove 3.

However, because the suspension 3 disclosed in Japanese Unexamined Patent Application Publication No. 9-213036 is configured to hold the slider 4 only by bonding the upper face of the slider 4 onto an upper face of the slider-mounting portion 3a, the electrical connection between the lead wire 1 formed on the suspension 3 and the electrode on the slider 4 tends to be cut off when external force is applied thereto. In particular, when the slider 4 moves away in a direction toward the leading-side, the electrical connection is easily cut off.

Further, when the lead wire 1 is connected to the electrode 12 on the slider 4, the slider 4 is mounted on the slider-mounting portion 3a such that the lead wire 1 and the electrode 12 are spaced at a predetermined distance and then, the slider 4 is moved toward a position at which the lead wire 1 and the electrode 12 are brought into contact with each other, and the lead wire 1 and the electrode 12 are connected. In the suspension 3 disclosed in Japanese Unexamined Patent Application Publication No. 9-213036, the slider 4 is required to be held at a position at which the lead wire 1 and the electrode 12 are brought into contact with each other until the connection between the lead wire 1 and the electrode 12 is completely performed, and until the slider 4 and the slider-mounting portion 3a are completely bonded to be fixed to each other. Therefore, the connecting work for the lead wire 1 and the electrode 12 becomes troublesome and much time is required for the connecting work. Accordingly, there has been a limitation in effectively manufacturing the suspension 3.

Furthermore, in the suspension 3 disclosed in Japanese Unexamined Patent Application Publication No. 9-213036, because the slider 4 is bonded to be fixed on the slider-mounting portion 3a and the electrode 12 is connected to the lead wire 1 by a supersonic bonding under heating, the slider 4 cannot be easily attached to and detached from the suspension 3.

Moreover, in the HGA disclosed in Japanese Unexamined Patent Application Publication No. 6-203507, because the magnetic head slider 1 is hooked at the supporting spring 4 in a state of being inserted from the open-end side into the hooking concave portion 4a, the magnetic head slider 1 tends to be displaced toward the open-end side. Particularly, in FIG. 4 in Japanese Unexamined Patent Application Publication No. 6-203507, a conductive member is provided in the core chip 2 provided in the magnetic head slider 1 and the conductive member is configured to extend from the core chip 2 toward opposite side of the open-end. However, a problem occurs that when the magnetic head slider 1 is displaced to the open-end side, the conductive member extended from the core chip 2 is cut out or the electrical connection between the core chip 2 and the conductive member is cut off.

Furthermore, in the HGA disclosed in Japanese Unexamined Patent Application Publication No. 6-203507, the magnetic head slider 1 is fixed with the supporting spring 4 through the bonding means, such as epoxide resin or the like formed in the supporting spring fixing groove 3. The reason that the magnetic head slider 1 is thus fixed with the supporting spring 4 through the bonding means, such as epoxide resin or the like, is considered to be that in the magnetic head slider 1, because the fitting convex piece 4b is hooked with the hooking concave portion 4a only by being inserted into the supporting spring fixing groove 3 from a side thereof resulting in that the magnetic head slider 1 has a structure to be easily displaced from the hooking concave portion 4a to the open-end side, the magnetic head slider 1 is fixed with the supporting spring 4 through the bonding means, such as epoxide resin or the like, so as to avoid the displacement. Thus, in the HGA disclosed in Japanese Unexamined Patent Application Publication No. 6-203507, because the magnetic head slider 1 is easily displaced from the hooking concave portion 4a, the magnetic head slider 1 is required to be fixed so as not to move toward an open-end side until the bonding means, such as epoxide resin is solidified.

Accordingly, the fixing work for the magnetic head slider 1 and the supporting spring 4 becomes troublesome and much time is required for the fixing work. Therefore, there has been a limitation in efficiently manufacturing the HGA.

In addition, in the HGA disclosed in Japanese Unexamined Patent Application Publication No. 6-203507, because the magnetic head slider 1 is bonded with the fitting convex piece 4b of the supporting spring 4 through the bonding means, such as epoxide resin or the like, formed in the supporting spring fixing groove 3 in the magnetic head slider 1 so as to firmly fix the magnetic head slider 1 with the supporting spring 4, the magnetic head slider 1 cannot be easily attached to or detached from the supporting spring 4.

Further, in the HGA disclosed in Japanese Unexamined Patent Application Publication No. 6-203507, there is no description or suggestion with regard to a device for improving an electrical connection between the conductive member extending from the core chip 2 and the core chip 2.

SUMMARY OF THE INVENTION

Accordingly, the present invention is made in light of the above described conventional problems and it is an object of the present invention to address and resolve these and other problems, and to provide a supporting member with high versatility capable of realizing a good electrical connection between an electric circuit formed in the supporting member and the slider, and capable of efficiently performing a process for holding the slider with ease and capable of attaching and detaching the slider.

Further, it is another object of the present invention to provide a testing method using the supporting member capable of reducing a manufacturing cost for a magnetic head apparatus and capable of contributing to efficiently manufacturing the magnetic head apparatus.

According to an aspect of the present invention, a supporting member includes a first supporting portion and a second supporting portion fixed to the first supporting portion, in which a conductive pattern is formed in the second supporting portion and the second supporting portion includes a holding portion for holding a slider having magnetic elements for recording and/or replaying, and in which a plurality of fixing portions are formed in the holding portion, and in which when the slider is sandwiched between the plurality of fixing portions, the slider is electrically connected to the conductive pattern.

According to another aspect of the present invention, the fixing portion may have elasticity and the slider may be held in the holding portion by pressing force caused by the elasticity of the fixing portion in the supporting member.

According to still another aspect of the present invention, the fixing portion may be formed of a notched piece formed at the holding portion.

According to further aspect of the present invention, the fixing portion is preferable to be composed of a first fixing portion and a second fixing portion, in which any one of the first fixing portion or the second fixing portion may serve as a positioning portion for positioning the slider in the supporting member.

According to still further aspect of the present invention, the slider may be detachably held by the holding portion, or the slider may be bonded with the holding portion in a state of being held in the holding portion.

According to another aspect of the present invention, a hooking device capable of being hooked with the first fixing portion is formed at a leading-side end face of the slider, and the slider may be preferably held by the holding portion, in which the hooking device and the first fixing portion are in a state of being hooked each other.

According to still another aspect of the present invention, the hooking device may be caved in a direction toward a trailing-side end face and may serve as a concave portion positioned between both side-faces of the slider.

According to further aspect of the present invention, the hooking device may be caved in a direction toward a trailing-side end face and may serve as a concave groove consecutively formed from one side-face to the other side-face of the slider.

According to still further aspect of the present invention, the hooking device may be protruded in a direction opposite to the trailing-side end face of the slider and may serve as a protruding portion positioned between both side-faces of the slider.

According to still further aspect of the present invention, the hooking device may be protruded in a direction opposite to the trailing-side end face of the slider and may serve as a protruding ridge consecutively formed from one side-face to the other side-face.

According to another aspect of the present invention, a method for testing dynamic-characteristics evaluation test for a slider includes the steps of, scanning a recording medium with a slider using a supporting member, including, a first supporting portion and a second supporting portion fixed to the first supporting portion, in which a conductive pattern is formed in the second supporting portion and the second supporting portion includes a holding portion for holding the slider having magnetic elements for recoding and/or replaying, and in which a plurality of fixing portions are formed in the holding portion, and when the slider is sandwiched between the plurality of fixing portions, the slider is electrically connected to the conductive pattern.

According to still another aspect of the present invention, the method for testing dynamic-characteristics evaluation test for a slider includes the steps of, holding the slider having the magnetic element for recording in the holding portion.

According to further aspect of the present invention, because the slider is held by the second supporting portion in a state of being sandwiched between the plurality of fixing portions, the terminal portion of the slider can be electrically connected with the conductive pattern formed in the second supporting portion firmly.

According to still further aspect of the present invention, because the slider is firmly held by the holding portion formed in the second supporting portion only by mounting on between the fixing portions, displacement thereof is hard to occur and the slider is easily held.

According to still further aspect of the present invention, because the slider can be detachably held and can be held in a state of being bonded, a supporting member with high versatility can be provided.

BRIEF DESCRIPTION OF THE DRAWINGS

FIG. 19 is a perspective view illustrating another embodiment of the slider supported by the supporting member of FIG. 1, looking from the leading side.

DESCRIPTION OF THE PREFERRED EMBODIMENTS

Figure 1:
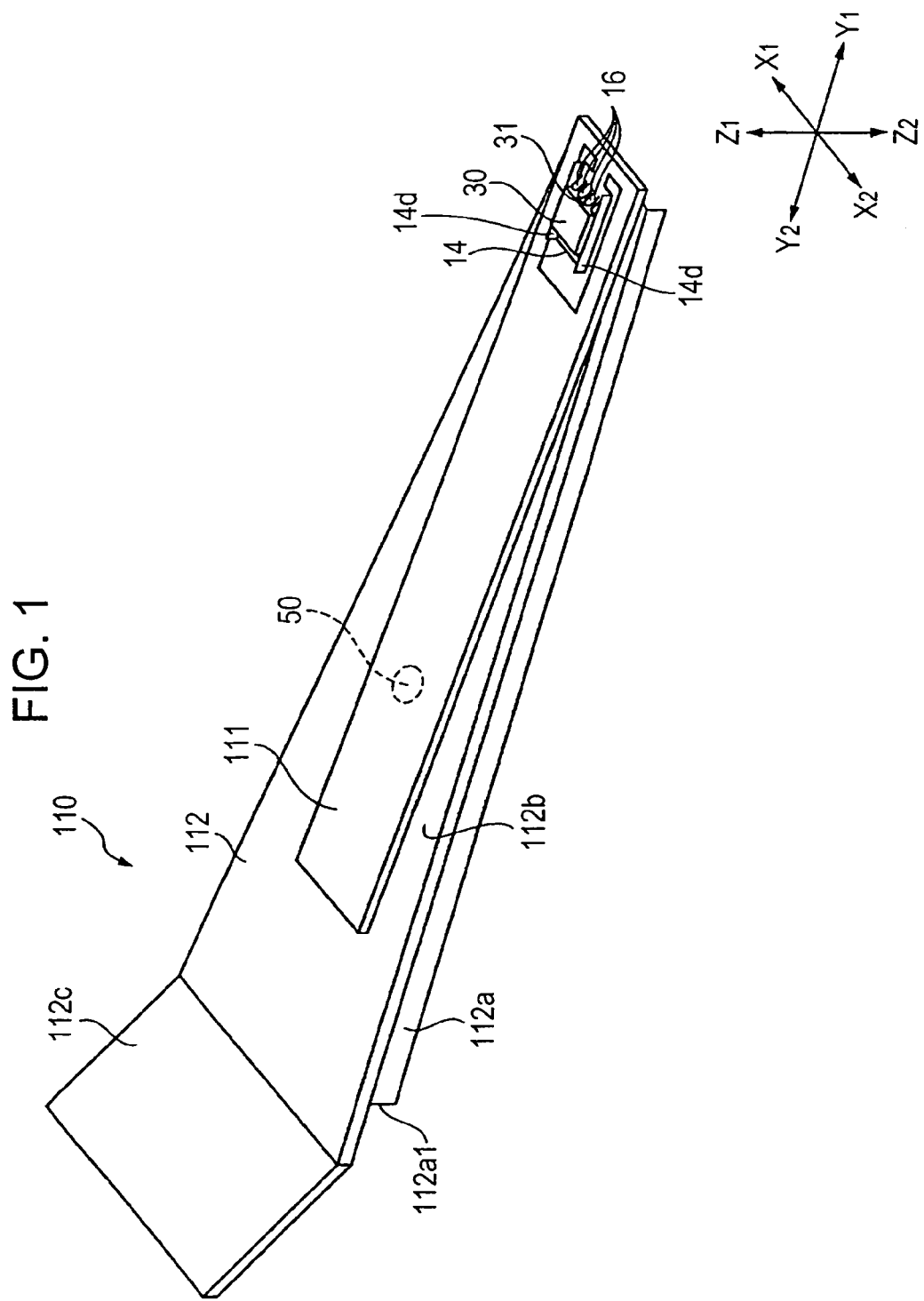
FIG. 1 is a partial perspective view illustrating an embodiment of a supporting member of the present invention and a slider held by the supporting member, looking from the side facing a recording medium.
Figure 2:
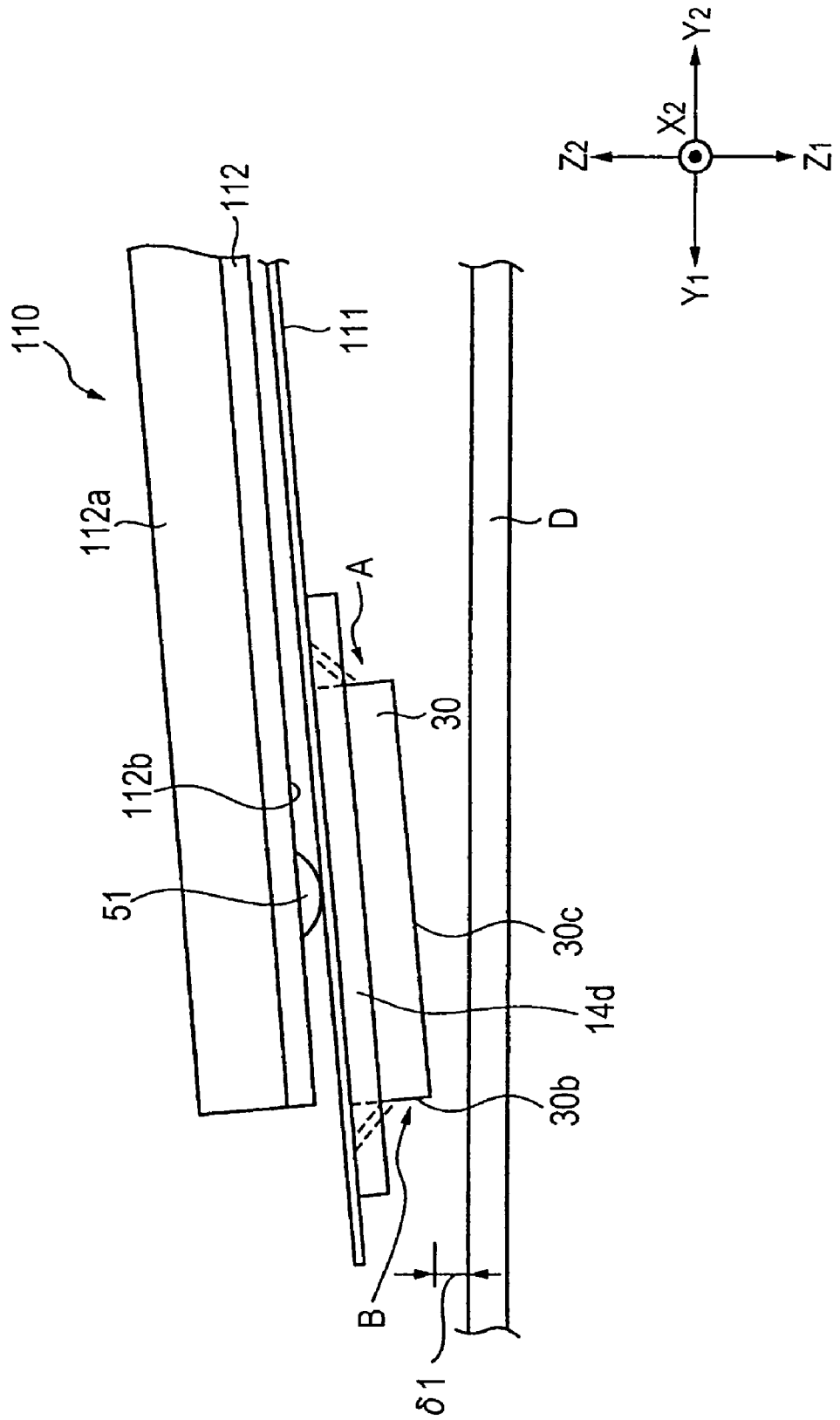
FIG. 2 is a partial side elevation illustrating the supporting member and the slider of FIG. 1, together with a recording medium, in which a face of the slider and the supporting member facing a recording medium is directed to a lower side of the drawing.
Figure 3:
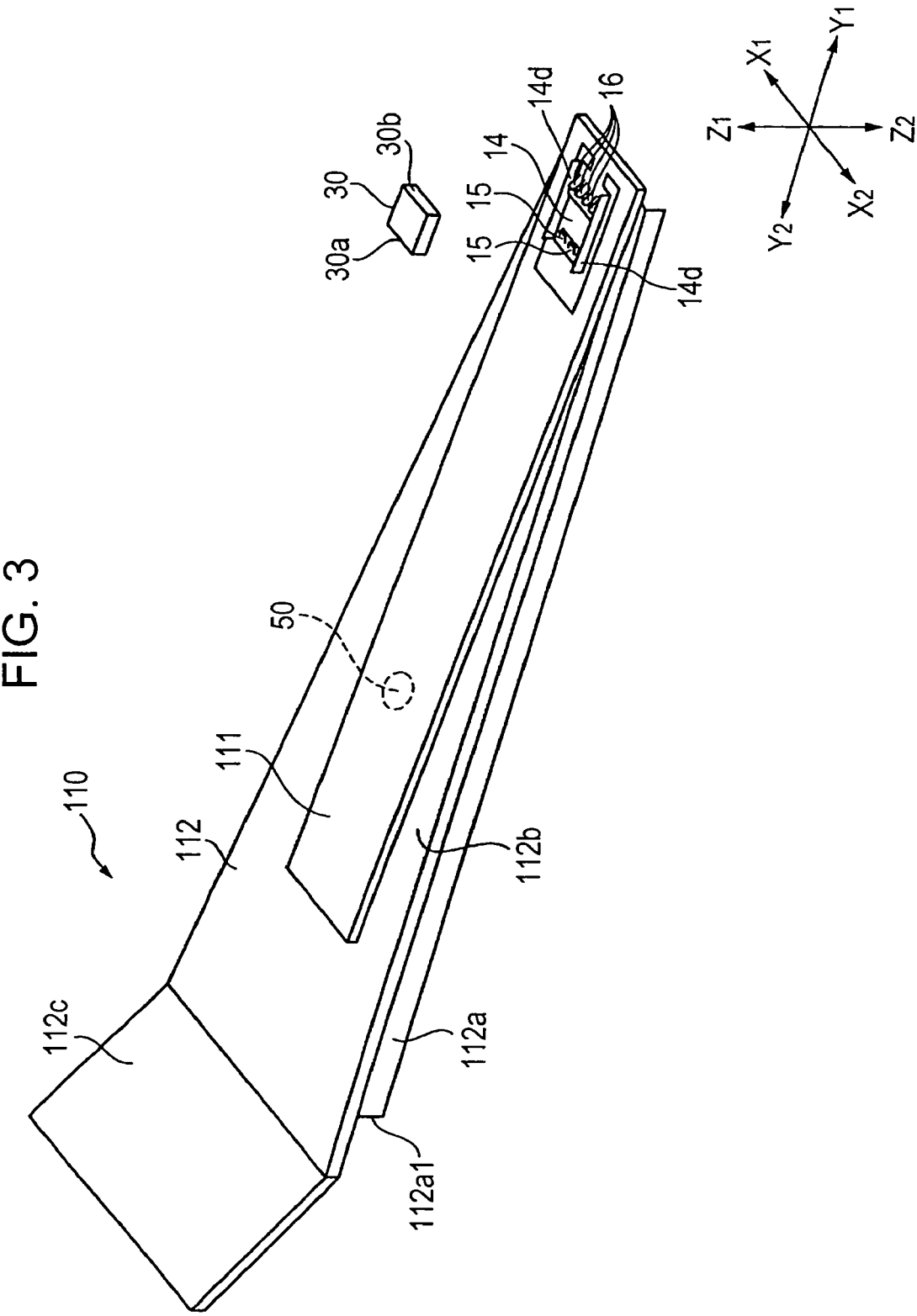
FIG. 3 is an exploded perspective view illustrating the supporting member and the slider of FIG. 1, looking from a side of the face facing the recording medium.
Figure 4:
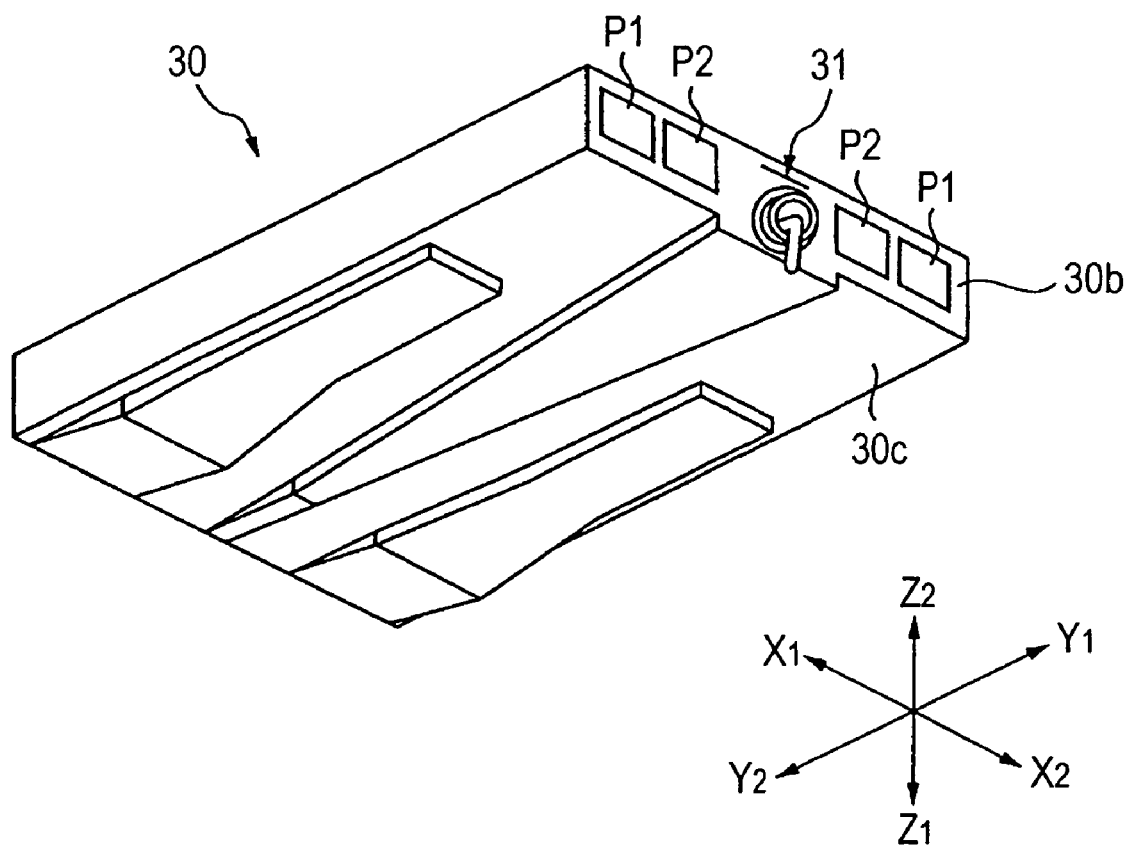
FIG. 4 is a perspective view illustrating the slider to be held by the supporting member of FIG. 1.

FIG. 1 is a partial perspective view illustrating an embodiment of a supporting member of the present invention and a slider held by the supporting member, looking from the side facing a recording medium, FIG. 2 is a partial side elevation illustrating the supporting member and the slider of FIG. 1, together with a recording medium, in which a face of the slider and the supporting member facing a recording medium is directed to a lower side of the drawing, FIG. 3 is an exploded perspective view illustrating the supporting member and the slider of FIG. 1, looking from a side of the face facing the recording medium, and FIG. 4 is a perspective view illustrating the slider to be held by the supporting member of FIG. 1. In addition, an arrow Z1 indicates the direction of the side facing a recording medium in each of the drawings.

As illustrated in FIG. 1, the supporting member 110 is composed of a load beam 112 that serves as a first supporting portion and a flexure 111 that serves as a second supporting portion fixed to the load beam 112. The flexure 111 holds a slider 30 while being supported by the load beam 112.

The above-mentioned slider 30 is made of, for example, ceramic material such as alumina titanium carbide ($Al_2O_3$—TiC) or the like, and is provided with a magnetic element 31, terminal portions P1, P1, and P2, P2 at a trailing-side end face 30b of the slider 30.

The magnetic element 31 is made by a thin-film formation using spattering technology and is formed by laminating a GMR element represented by a spin valve film or an MR-head (replaying head) including a magneto-resistive-effect-element of an AMR element and an inductive head for recording.

A coil layer (not shown) of the inductive head that constitutes the magnetic element 31 is connected to the terminal portions P1, P1 via a lead layer (not shown). In addition, a detecting current is applied from the terminal portions P2, P2 to the MR-head and a replaying magnetic signal of the MR-head is obtained from the terminal portions P2, P2.

Further, the magnetic element 31 may be that provided with either one of a replaying head or the inductive head.

The supporting member 110 is composed of the flexure 111 that supports the slider 30 and the load beam 112 that supports the flexure 111. The load beam 112 is made of leaf spring member such as stainless steel. A bent portion 112a having rigid structure is formed at both side ends of the load beam 112. A leaf spring functional portion that is not provided with the bent portion 112a is formed around an area from an end 112a1 of the bent portion 112a to a base end area 112c of the load beam 112 and the slider 30 is elastically supported by elastic force of the leaf spring functional portion above the recording medium.

Furthermore, the base end area 112c of the load beam 112 serves as a mount portion and is attached to a drive device (not shown) of a hard disk apparatus side.

As illustrated in FIG. 2, when the a disk D that serves as a recording medium starts to be rotated by action of a rotation drive section of the drive device, the slider 30 supported by the supporting member 110 is moved floating above the disk D that serves as a recording medium at a predetermined distance δ1 (spacing distance). This is because an air flow is led along a moving direction of the disk D at a space between the slider 30 and a surface of the disk D, and a face 30c (face ABS) that faces the recording medium receives floating force caused by an air flow.

Figure 5:
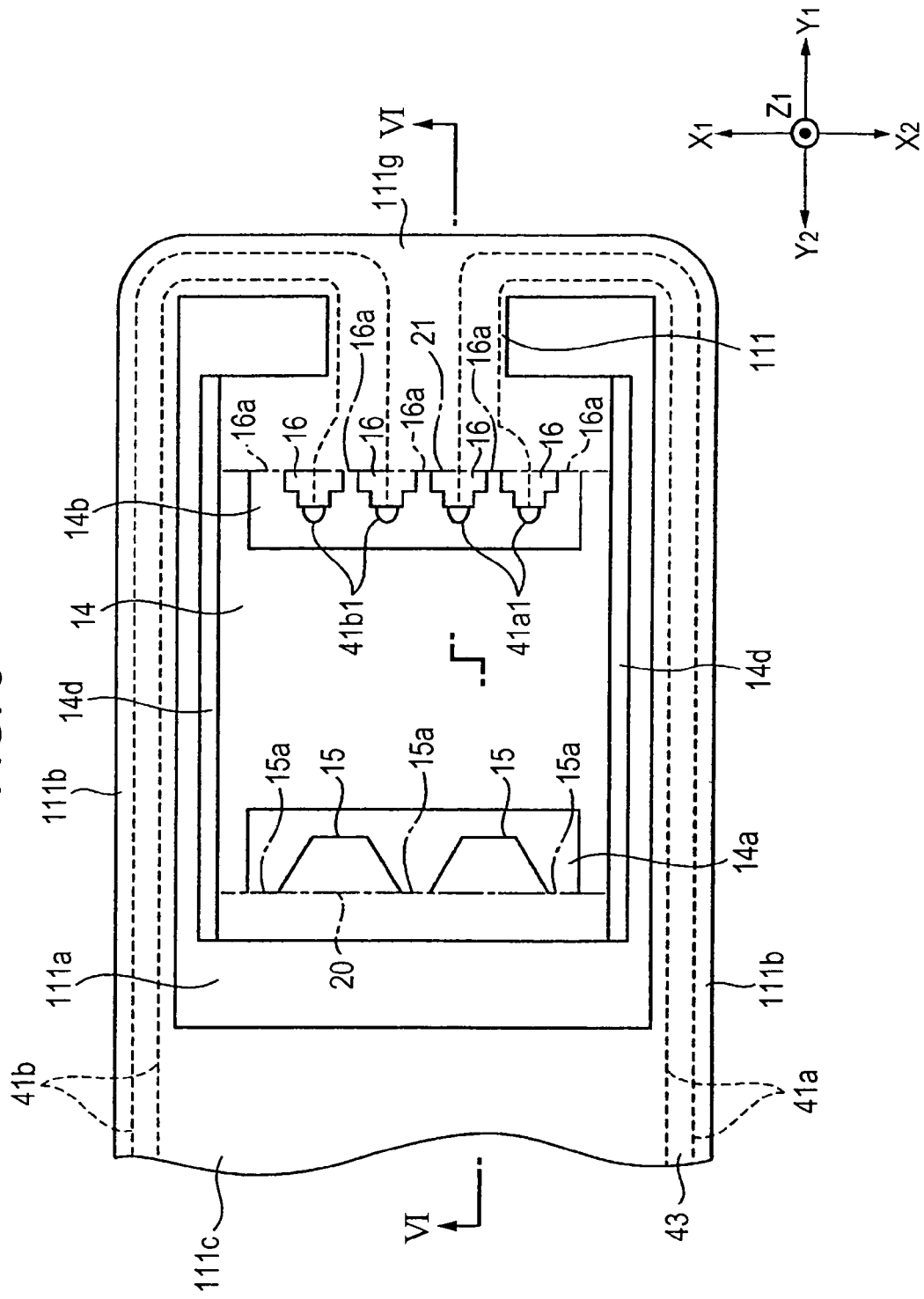
FIG. 5 is a partial plan view illustrating proximity of a tip end of a second supporting portion of the supporting member of FIG. 1, looking from the side of the face facing the recording medium.
Figure 6:
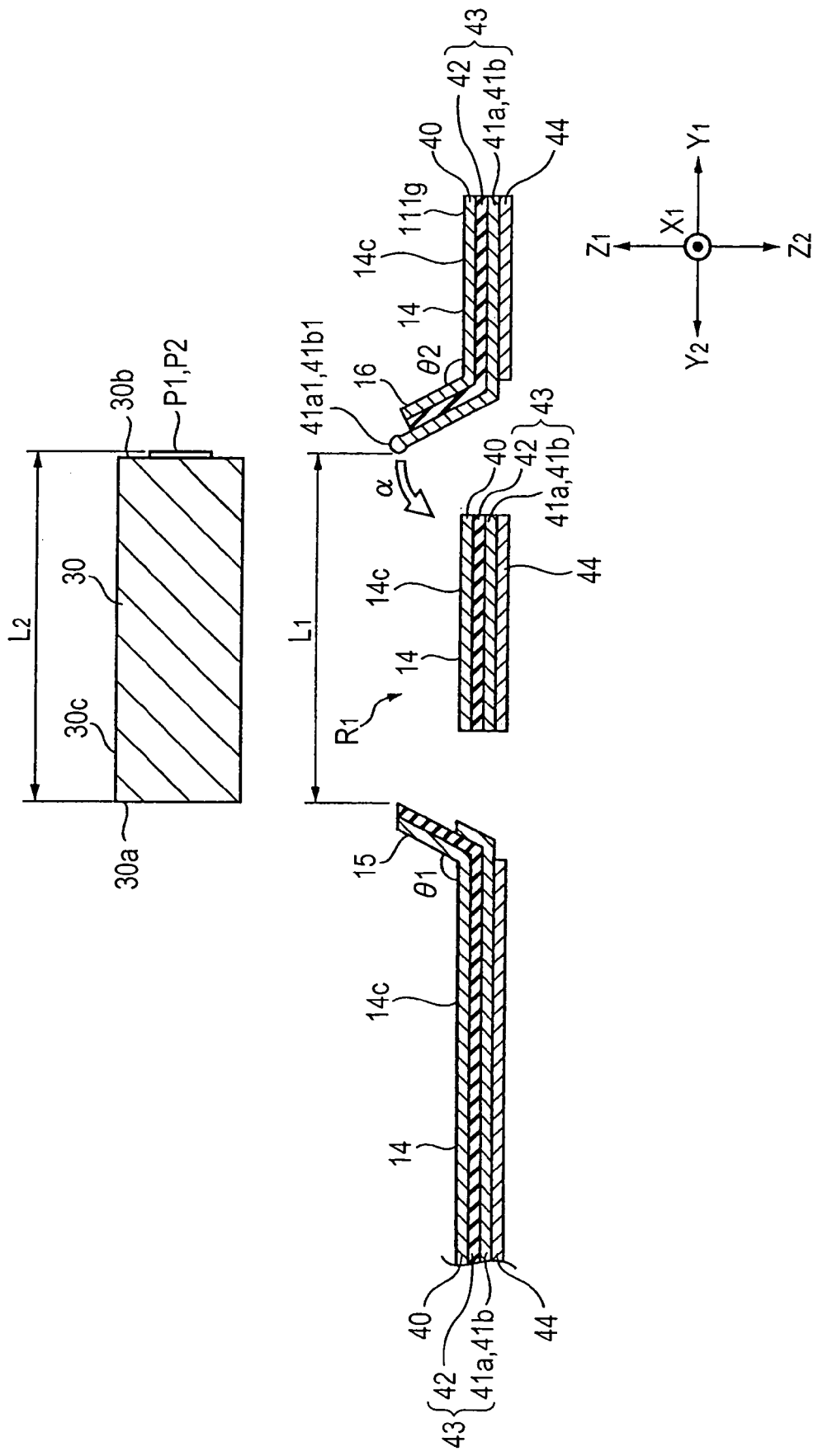
FIG. 6 is a partially cutaway cross-section of FIG. 5 cut by a cutting line VI-VI illustrating the cutaway cross-section of the proximity of the tip end of the second supporting portion of the supporting member, together with the slider of FIG. 4.

FIG. 5 is a partial plan view illustrating proximity of a tip end of the flexure 111 of the supporting member of FIG. 1, looking from the side of the face facing the recording medium, and FIG. 6 is a partially cutaway cross-section of FIG. 5 cut by a cutting line VI-VI, illustrating the cutaway cross-section of the proximity of the tip end of the second supporting portion of the supporting member together with the slider 30 illustrated at an upper part of the drawing. As illustrated in FIG. 5, a notched portion 111a is formed at the proximity of the tip end of the flexure 111 and two arm portions 111b, 111b separated by the notched portion 111a are extending toward tip ends thereof, and the two arm portions 111b, 111b are connected with each other by a connecting portion 111g at the tip end. Further, a connecting arm portion 111c extending from the connecting portion 111g toward a direction of the base end portion (in a direction indicated by an arrow Y2 in FIG. 5) is provided and a holding portion 14 is integrally formed with the connecting arm portion 111c.

Bent portions 14d are formed at both side end portions of the holding portion 14 and a structure of the bent portion 14d has rigidity accordingly.

Further, notched portions 14a and 14b are formed in the holding portion 14. A first fixing portion 15 is formed by a notched piece separated by the notched portion 14a and a second fixing portion 16 is also formed by a notched piece separated by the notched portion 14b.

As illustrated in FIG. 6, the first fixing portion 15 is configured to rise up at a predetermined angle of θ1 from a surface 14c of the holding portion 14 toward a side of the face 30c of the slider 30 facing the recording medium (in a direction indicated by an arrow Z1) at a fold back line 20 that connects the base end portions 15a shown in FIG. 5. Similarly, the second fixing portion 16 is also configured to rise up at a predetermined angle of θ2 from the surface 14c of the holding portion 14 toward a side of the face 30c facing the recording medium (in a direction indicated by the arrow Z1) at a fold back line 21 that connects the base end portions 16a shown in FIG. 5.

The slider 30 is held by the holding portion 14 and explanation thereof will be described later.

As illustrated in FIGS. 5 and 6, the flexure 111 is provided with a wiring member 43 including conductive patterns for replaying 41a, 41a and conductive patterns for recording 41b, 41b. As illustrated in FIG. 6, the wiring member 43 is composed of the conductive patterns for replaying 41a, 41a, and the conductive patterns for recording 41b, 41b made of conductive material such as cupper or the like, disposed at a side of a thin leaf spring 40 having elasticity made of stainless steel or the like opposite to the face 30c that faces the recording medium (in a direction indicated by an arrow Z2) through an insulating layer 42 made of insulating material such as polyimide or the like.

A protecting layer 44 is formed underneath the conductive patterns for replaying 41a, 41a, and that for recording 41b, 41b, each of which covers the conductive patterns for replaying 41a, 41a, and that for recording 41b, 41b.

As illustrated in FIGS. 5 and 6, tip end portions 41a1, 41a1 of the conductive patterns for replaying 41a, 41a and the tip end portions 41b1, 41b1 of the conductive patterns for recording 41b, 41b are exposed from a tip end of the second fixing portion 16. However, the tip end portions 41b1, 41b1 may be covered with material having high conductivity such as gold, or the like.

As illustrated in FIGS. 1 and 2, the flexure 111 is positioned at a side of the face 30c facing the recording medium and is bonded by a bonding means, such as spot welding or the like to a face 112b of the face 30c side of the load beam 112 at a bonding portion 50 as illustrated in FIG. 1.

As illustrated in FIG. 2, for example, a hemispherical pivot 51 is formed to be protruded on the face 112b of the load beam 112 and because the pivot 51 is brought into contact with the holding portion 14, the slider 30 held by the holding portion 14 is elastically supported with a central focus on a top of the pivot 51.

As described above, the slider is held being mounted on the holding portion 14 formed on the flexure 111. A method for mounting the slider 30 on the holding portion 14 will be explained below.

As illustrated in FIG. 6, the first fixing portion 15 and the second fixing portion 16 are formed to be rise up toward the side of the face facing the recording medium from the holding portion 14. The slider 30 is mounted on the surface 14c of the holding portion 14 within an area R1 positioned between the first fixing portion 15 and the second fixing surface 16. The shortest interval L1 of the space between the first fixing portion 15 and the second fixing portion 16 is set greater than an interval L2 between a leading-side end face 30a of the slider 30 and a side-face of the terminal portion P1 (P2) formed at the trailing-side end face 30b. Accordingly, the slider 30 is able to be mounted in the area R1 from the side of the face facing the recording medium (in a direction indicated by the arrow Z1).

Next, the leading-side end face 30a of the slider 30 is moved to the direction of the first fixing portion 15 (in a direction indicated by an arrow Y2) and is brought into contact with the first fixing portion 15.

Then, the second fixing portion 16 is bent in a direction toward the slider 30 as indicated by an arrow such that the angle θ2 gradually increases and the tip end portions 41a1, 41a1 of the conductive patterns for replaying 41a, 41a and the tip end portions 41b1, 41b1 of the conductive patterns for recording 41b, 41b are brought into contact with the terminal portions P1 and P2. The slider 30 is thereby brought to be sandwiched between the first fixing portion 15 and the second fixing portion 16 within the area R1 as illustrated in FIG. 7.

Figure 7:
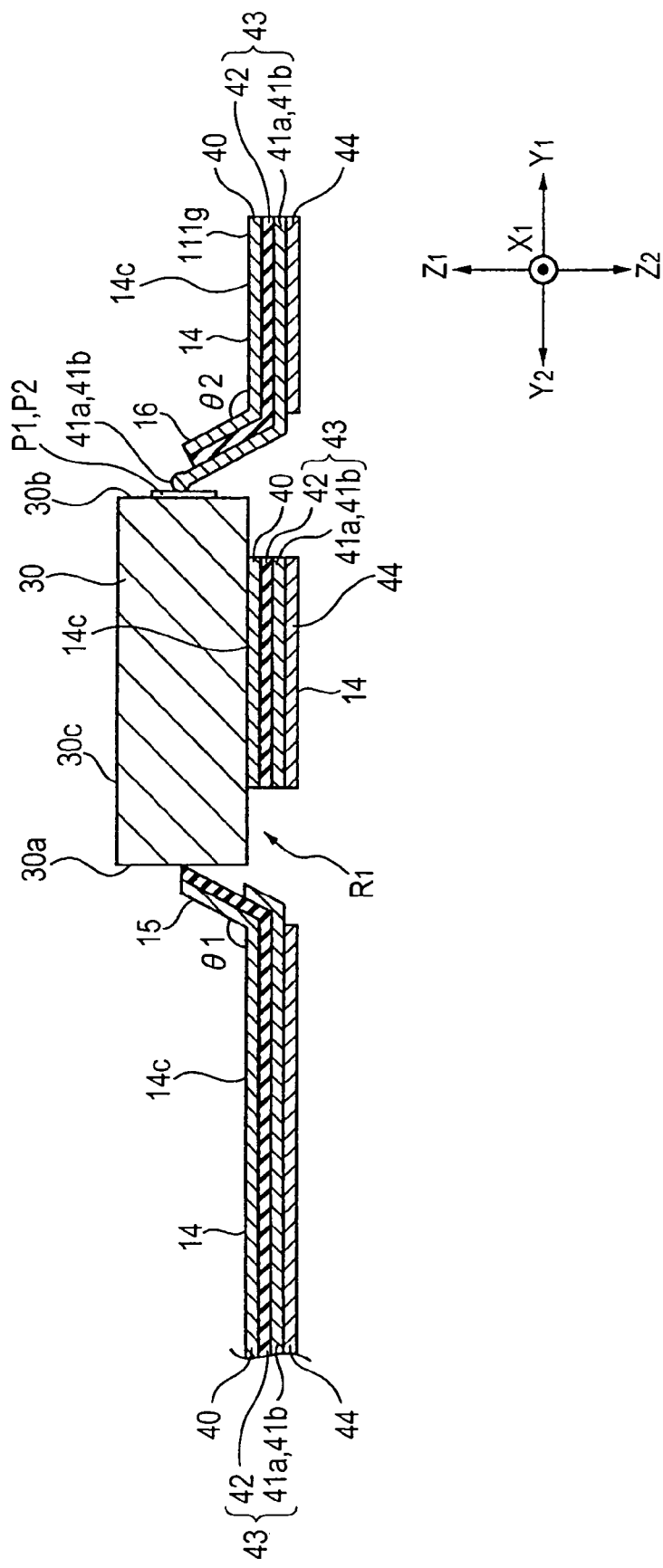
FIG. 7 is a partial cross-section illustrating the slider of FIG. 4 being held by the supporting member of FIG. 1.

As illustrated in FIG. 7, when the slider 30 is in a state of being sandwiched between the first fixing portion 15 and the second fixing portion 16 within the area R1, pressing force (elastic pressing force) caused by elasticity is applied to the first fixing portion 15 in a direction toward the leading-side end face 30a of the slider 30. On the other hand, elastic pressing force is applied to the second fixing portion 16 in the direction toward the trailing-side end face 30b of the slider 30. This is because the leaf spring 40 that constitutes the first fixing portion 15 and the second fixing portion 16 has elasticity resulting in causing the first fixing portion 15 and the second fixing portion 16 to have elasticity. In particular, because in the flexure 111, the leaf spring 40 is positioned at a face of the side of the direction toward the slider 30 (in a direction indicated by an arrow Z1), it is easy to apply the elasticity to the first fixing portion 15 and the second fixing portion 16.

Thus, when the slider 30 is sandwiched between the first fixing portion 15 and the second fixing portion 16, because the elastic force is applied to the first fixing portion 15 and the second fixing portion 16 in a direction for pressing the slider 30, the slider 30 is firmly held by the holding portion 14. Accordingly, the tip end portions 41a1, 41a1 of the conductive patterns for replaying 41a, 41a and the tip end portions 41b1, 41b1 of the conductive patterns for recording 41b, 41b formed at a tip end of the second fixing portion 16 can be securely brought into contact with the terminal portions P1 and P2, resulting in improving electrical connection between the tip end portions 41a1, 41a1, and 41b1, 41b1 and the terminal portions P1 and P2.

Further, because the slider 30 is firmly held by the holding portion 14 only by mounting the slider 30 within the area R1, a displacement of the slider 30 hardly occurs and a holding work for the slider onto the flexure 111 becomes easy.

Furthermore, because the elastic force is applied to the direction for pressing the slider 30 in the second fixing portion 16, the tip end portions 41a1, 41a1 of the conductive patterns for replaying 41a, 41a and the tip end portions 41b1, 41b1 of the conductive patterns for recording 41b, 41b can be securely brought into contact with the terminal portions P1 and P2, and therefore, the electrical connection between the tip end portions 41*a*1, 41*a*1 and 41*b*1, 41*b*1 and the terminal portions P1 and P2 can be improved.

In addition, in a process for sandwiching the slider 30 on the holding portion 14, it is preferable to bend only the second fixing portion 16 in a direction toward the slider 30 and not to bend the first fixing portion 15 in the same direction. This is because the first fixing portion 15 is determined to function as a positioning portion for the slider 30. In other word, when the first fixing portion 15 is bent, the position of the leading-side end face 30*a* of the slider 30 varies every time and the function of the first fixing portion 15 as the positioning portion cannot be secured. Therefore, when the first fixing portion 15 is determined not to be bent in a direction toward the slider 30, the first fixing portion 15 can serve as the positioning portion. When the first fixing portion 15 serves as the positioning portion, the slider 30 can be accurately and evenly disposed on the holding portion 14.

The slider 30 is supported by the elastic pressing force of the first fixing portion 15 and the second fixing portion 16 on the holding portion 14, and the bonding means, such as adhesive agent or the like is not used. This enables the slider 30 to be detachable from the holding portion 14.

When the slider 30 is detachably held by the holding portion 14, the supporting member 110 can be used as a testing apparatus for testing the slider 30. Explanation for that will be made below.

In general, the slider 30 becomes part of a commercialized magnetic element apparatus through a wafer process, a slider process, and a head gimbal assembly (HGA) process. In the wafer process, a wafer, on which a number of magnetic elements 31 are formed on a substrate is manufactured and in the subsequent slider process, the wafer is cut and a slider bar composed of a series of magnetic elements 31 is manufactured. Thereafter, when the slider bar is diced into individual sliders, the slider 30, shown in FIG. 4 is manufactured. Further, the slider 30 is fixed onto the flexure 111 and the flexure 111 is fixed onto the load beam 112 (hereinafter referred to as HGA process). Thus, the magnetic element apparatus, on which the slider 30 is mounted is manufactured.

Thus, the slider 30 is manufactured and commercialized by being incorporated into the magnetic element apparatus. Meanwhile, an electrical characteristics test for the magnetic element 31 formed on the slider 30 is performed in general cases. In the electrical characteristics test, a static-characteristics evaluation test, performed in the above-mentioned slider process and a dynamic-characteristics evaluation test are performed. The static-characteristics evaluation test is a test in which a magnetic field is applied to the slider 30 in a state of a single piece and the electrical characteristics of the magnetic element 31 at that state are performed. On the other hand, the dynamic-characteristics evaluation test is a test in which the electrical characteristics of the magnetic element 31 are tested by practically scanning the slider 30 above the recording medium.

Because the static-characteristics evaluation test for the slider 30 is performed in the state of a single piece, it is performed after the slider is formed in the slider process and before the HGA process is performed. In addition, because the dynamic-characteristics evaluation test is performed while the slider 30 is practically scanning above the recording medium, it is required that the slider 30 is in a state of being assembled on the flexure 111 and the load beam 112. Therefore, the dynamic-characteristics evaluation test is performed after the HGA process.

In the static-characteristics evaluation test, the electrical characteristics are tested by applying the magnetic field to the slider 30. Therefore, only the electrical characteristics test for the MR-head (replaying head) can be performed, i.e., the electrical characteristics of the inductive head cannot be tested. On the other hand, in the dynamic-characteristics evaluation test, the test is performed by scanning the slider 30 above the recording medium and the electrical characteristics of the inductive head for recording can be tested, in addition to the test for the electrical characteristics of the MR-head (replaying head).

When the slider 30 includes both the MR-head (replaying head) and the inductive head for recording, or only the inductive head for recording, the dynamic-characteristics evaluation test, which has to be assuredly performed after the HGA process is necessary, because the evaluation test for the electrical characteristics of the inductive head for recording is necessary. However, when a waster of the slider 30 below standard is found resulting from the dynamic-characteristics evaluation test, a selection for the waster of the slider 30 is required. However, because the waster of the slider 30 on selection has been already assembled with the flexure 111 or the load beam 112, a selection for the flexure 111 or the load beam 112 is also required together with the slider 30, resulting in tremendous loss of the manufacturing cost. Further, the time spent for the HGA process is also wasteful and as a result, efficient manufacture cannot be performed.

Accordingly, when the dynamic-characteristics evaluation test for only the single piece of the slider 30 can be performed before the HGA process, a decrease in manufacturing cost can be achieved and efficient manufacture can be performed.

In the supporting member 110 of the present invention, the slider 30 is detachably held by the holding portion 14 of the flexure 111. Therefore, when the slider 30 is held by mounting on the flexure 111 of the supporting member 110 before the slider process and when the slider 30 is detached from the flexure 111 after the dynamic characteristics evaluation test for the slider 30 is performed by scanning the slider above the recording medium, the dynamic-characteristics evaluation test for only the single piece of the slider 30 can be performed. As a result, manufacturing cost can be reduced and efficient manufacture can be performed. In particular, because the dynamic-characteristics evaluation test for the inductive head for recording can be performed before the HGA process, it is appropriate for the case when the inductive head for recording is formed on the slider 30.

However, in the supporting member 110 of the present invention, the slider 30 and the holding portion 14 may be bonded by the bonding means, such as adhesive agent, when the slider 30 is mounted on the holding portion 14 of the flexure 111. In addition, the slider 30 and the holding portion 14 may be bonded by the bonding means, such as ultrasonic bonding under heating, adhesive agent, or the like after the tip end portions 41*a*1, 41*a*1 of the conductive patterns for replaying 41*a*, 41*a* and the tip end portions 41*b*1, 41*b*1 of the conductive patterns for recording 41*b*, 41*b* are brought into contact with the terminal portions P1 and P2. By being configured as described above, slider 30 can be firmly held by the flexure 111, or the electrical connection between the tip end portions 41*a*1, 41*a*1 of the conductive patterns for replaying 41*a*, 41*a* and the tip end portions 41*b*1, 41*b*1 of the conductive patterns for recording 41*b*, 41*b* can be firmly brought into contact with the terminal portions P1 and P2. Therefore, the supporting member 110 can be commercialized with the slider 30 as a magnetic element apparatus capable of being mounted on hardware.

When the slider 30 and the holding portion 14 are bonded by the bonding means, such as adhesive agent or the like, or when the slider 30 and the holding portion 14 are bonded by the bonding means, such as ultrasonic bonding under heating, adhesive agent, or the like, after the tip end portions 41a1, 41a1 and 41b1, 41b1 are brought into contact with the terminal portions P1 and P2, the slider 30 is sandwiched between the first fixing portion 15 and the second fixing portion 16 keeping a state of being positioned by the first fixing portion 15, and fixed within the area R1 in the supporting member 110 of the present invention. Accordingly, even when the tip end portions 41a1, 41a1 and 41b1, 41b1 are bonded with the terminal portions P1 and P2 by ultrasonic bonding under heating, or the adhesive agent, the time and process for holding the slider 30 until the tip end portions 41a1, 41a1 and 41b1, 41b1 and the terminal portions P1 and P2 are completely connected, for preventing the slider 30 from displacement becomes unnecessary resulting in efficient manufacture. Further, the process and time for holding the slider 30 until adhesion fixing is completed, for preventing the slider 30 from displacement becomes unnecessary resulting in efficient manufacture.

Thus, because the supporting member 110 of the present invention can be used as a testing apparatus for use in dynamic-characteristics evaluation test for testing the slider 30 and other than that, the supporting member 110 can be also used as a magnetic element apparatus, mounted on hardware. Therefore, the supporting member 110 of the present invention has a high versatility.

Figure 8:
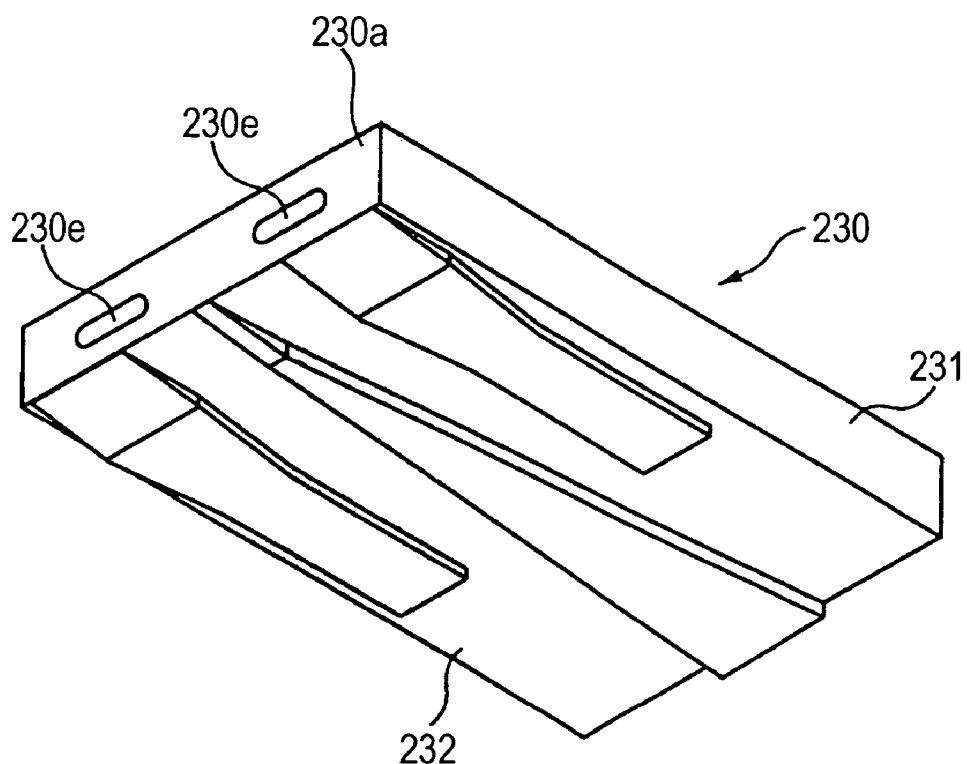
FIG. 8 is a perspective view illustrating another embodiment of the slider supported by the supporting member of FIG. 1, looking from the leading side.

FIG. 8 is a perspective view illustrating another embodiment of the slider 30 supported by the supporting member 110 illustrated in FIG. 1, looking from the leading-side.

A slider 230, shown in FIG. 8 is made of the same material as the slider 30, shown in FIG. 4 and is composed of the same constituent parts as that of the slider 30, shown in FIG. 4. Accordingly, a different part of the slider 230 from the slider 30 will be mainly explained below.

The part of the slider 230, shown in FIG. 8, different from that of the slider 30, shown in FIG. 4 is that a concave portion 230e serving as a hooking device for hooking the slider 230 with the flexure 111 is formed on a leading-side end face 230a. In the embodiment illustrated in FIG. 8, two concave portions 230e are formed on the leading-side end face 230a.

As illustrated in FIG. 8, the concave portions 230e are formed being positioned inside between one side-face 231 and the other side-face 232 in the leading-side end face 230a.

Figure 9:
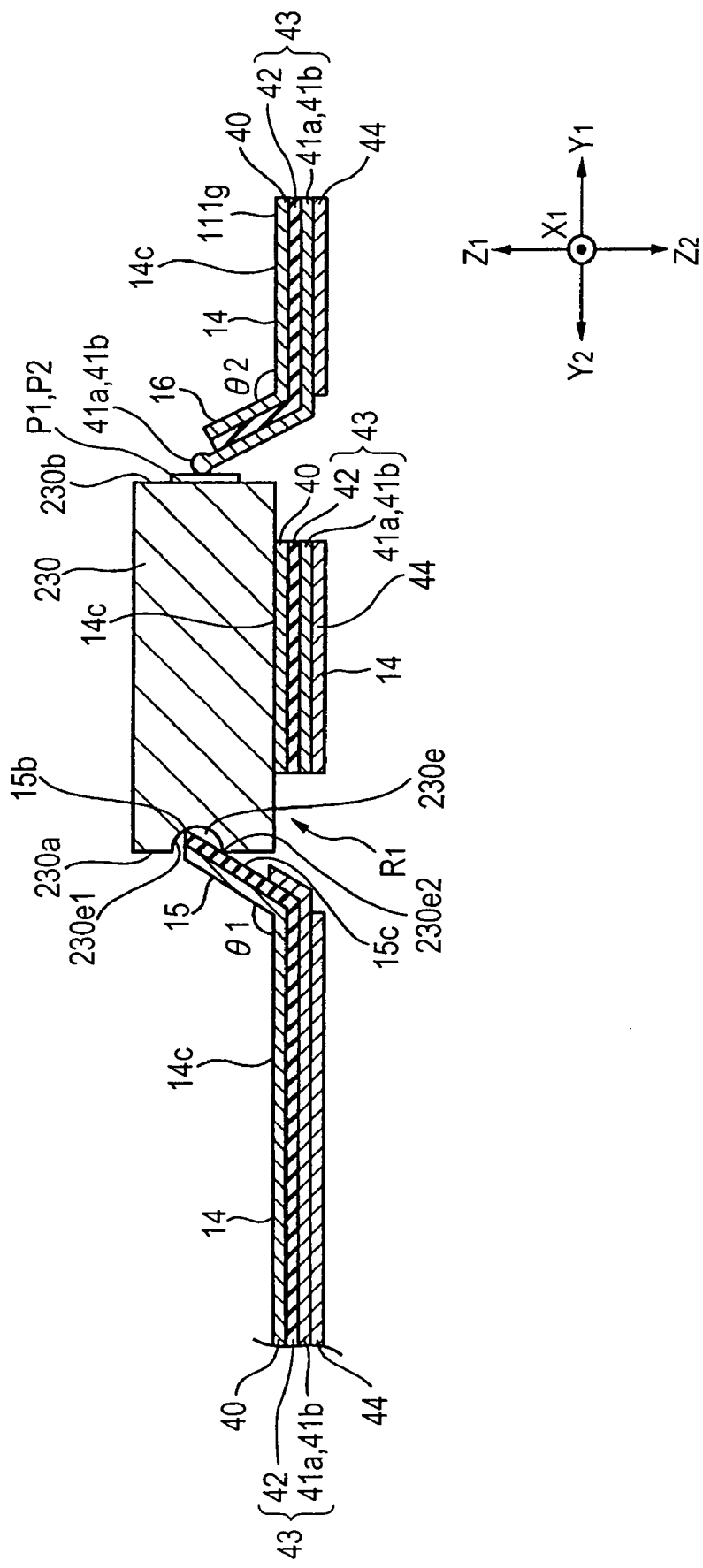
FIG. 9 is a partial cross-section illustrating the slider of FIG. 8 being held by the supporting member of FIG. 1.

FIG. 9 is a cross-section illustrating a state of the slider 230 held by the holding portion 14 being sandwiched between the first fixing portion 15 and the second fixing portion 16 formed on the flexure 111 within the area R1 of the flexure 111, and is a drawing corresponding to FIG. 7 that illustrates the slider 30 in FIG. 4 in a state of being fixed on to the flexure 111. Incidentally, the flexure in FIG. 9 is the same as that illustrated in FIG. 7, and thus, a same reference numeral is applied in FIG. 9 and an explanation thereof will be omitted.

As illustrated in FIG. 9, an internal face 230e1 of the concave portion 230e has a semicircular shape being caved in a direction toward a trailing-side end face 230b of the slider 230.

As illustrated in FIG. 9, when the slider 230 is fixed to the flexure 111, a tip end 15b of the first fixing portion 15 is positioned in the concave portion 230e. In addition, the tip end 15b of the first fixing portion 15 is hooked with the concave portion 230e in a state that the tip end 15b contacts the internal face 230e1 of the concave portion 230e. Further, an upper face 15c of the first fixing portion 15 contacts the upper edge 230e2 of the concave portion 230e.

As a result, the slider 230 is firmly fixed to the holding portion 14 and is positioned by both the tip end 15b of the first fixing portion 15 and the upper face 15c.

Thus, the slider 230 is configured to have the above structure, whereby the slider 230 is positioned securely to be firmly fixed to the flexure 111.

Further, when the slider 230 is in a state of being held by the flexure 111, there are two states. One state is that the tip end 15b of the first fixing portion 15 is hooked with the concave portion 230e by contacting the internal face 230e1 thereof. The other state is that the upper face 15c of the first fixing portion 15 contacts the upper edge 230e2 of the concave portion 230e. Either one of the aforementioned two states is sufficient for the slider 230 to be positioned securely to be firmly fixed to the flexure 111. However, it is more preferable that both the aforementioned two states are simultaneously applied thereto, because the slider 230 can be further securely positioned to be firmly fixed to the flexure 111.

Figure 10:
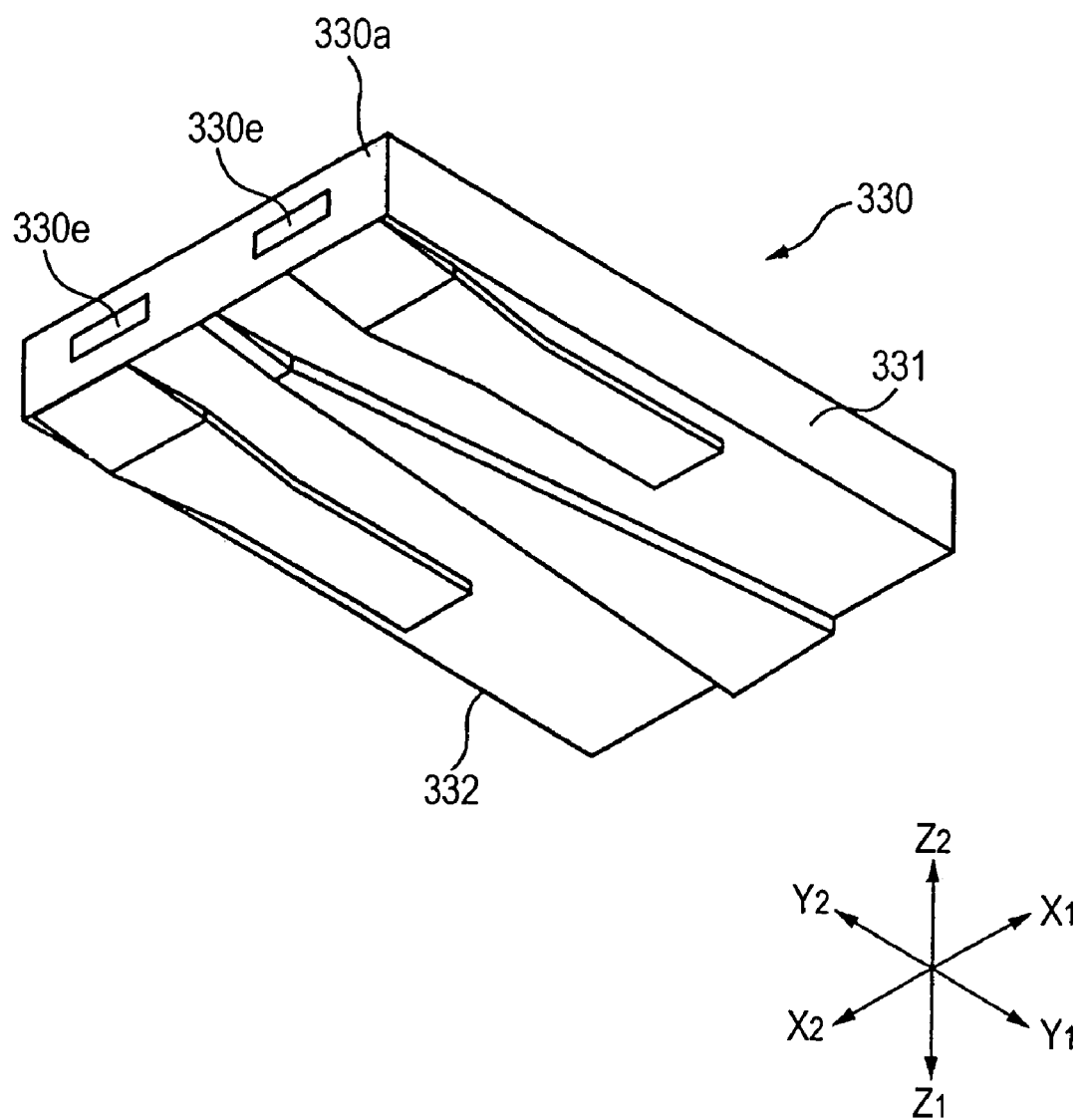
FIG. 10 is a perspective view illustrating another embodiment of the slider supported by the supporting member of FIG. 1, looking from the leading side.

FIG. 10 is a perspective view illustrating another embodiment of the slider supported by the supporting member 110 in FIG. 1, looking from the leading-side.

A slider 330, shown in FIG. 10 and the slider 230, shown in FIG. 8 are made of the same material as the slider 30 shown in FIG. 4, and is composed of the same constituent parts as that of the slider 30, shown in FIG. 4. Accordingly, a different part of the slider 330 from the slider 30, shown in FIG. 4 will be mainly explained below.

Part of the slider 330, shown in FIG. 10, different from the slider 30, shown in FIG. 4, is that a concave portion 330e serving as a hooking device for hooking the slider 330 with the flexure 111 is formed at a leading-side-face 330a, as shown in FIG. 10. In the embodiment illustrated in FIG. 11, two concave portions 330e are formed on the leading-side end face 330a.

As illustrated in FIG. 10, the concave portion 330e is formed being positioned inside between one side-face 331 and the other side-face 332 of the slider 330 in the leading-side end face 330a.

Figure 11:
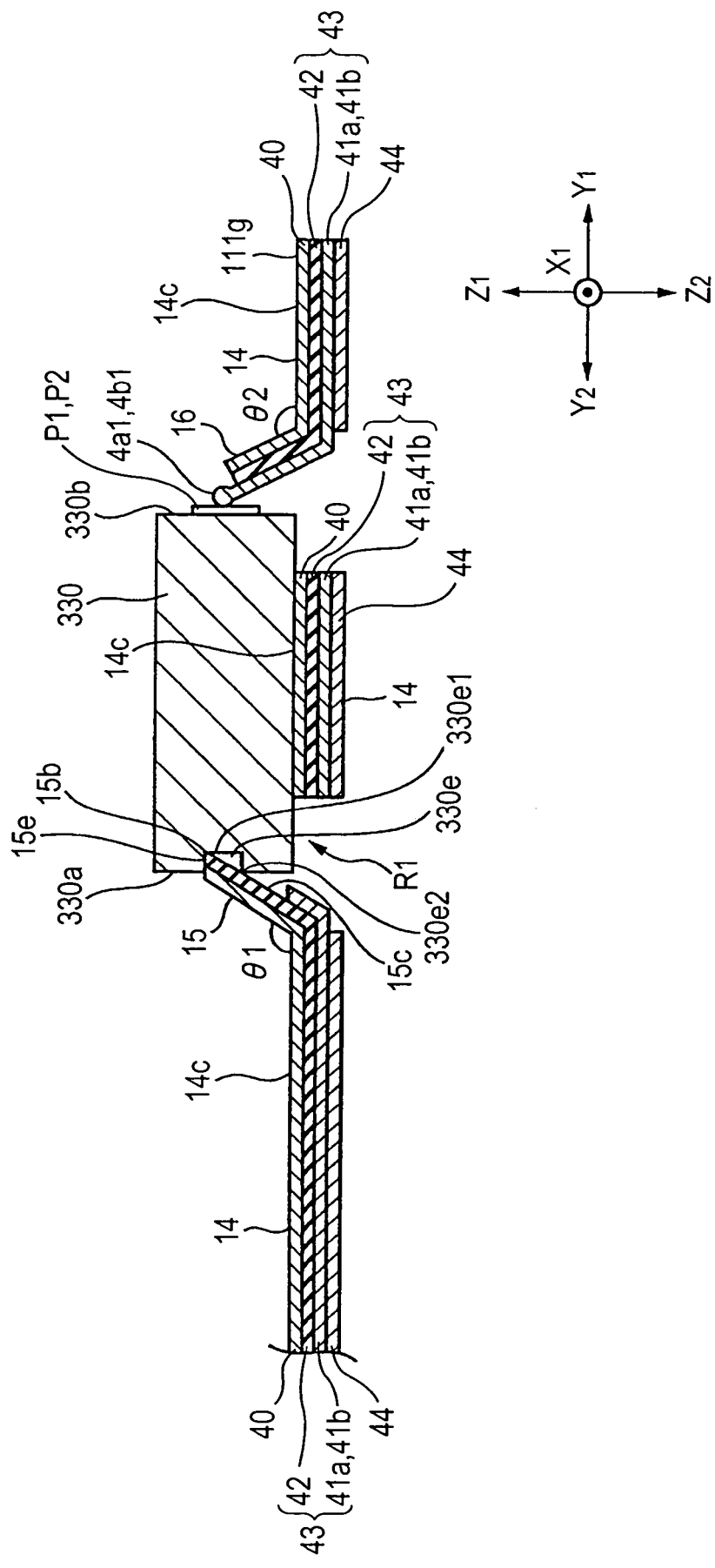
FIG. 11 is a partial cross-section illustrating the slider of FIG. 10 being held by the supporting member of FIG. 1.

FIG. 11 is a partial cross-section illustrating the slider 330 in a state of being sandwiched between the first fixing portion 15 and the second fixing portion 16 formed on the flexure 111 and held by the holding portion 14 within the area R1 of the flexure 111, and is a cross-section corresponding to FIG. 7, illustrating the slider 30, shown in FIG. 4, in a state of being fixed by the flexure 111. Incidentally, the flexure 111 in FIG. 11 is the same as that illustrated in FIG. 7, and thus, a same reference numeral is applied in FIG. 11 and an explanation thereof will be omitted.

As illustrated in FIG. 11, an internal face 330e1 of the concave portion 330e is formed in a rectangular shape being caved in a direction toward a trailing-side end face 230b.

As illustrated in FIG. 11, when the slider 330 is in a state of being fixed to the flexure 111, the tip end 15b of the first fixing portion 15 is positioned inside the concave portion 330e. In addition, the tip end 15b of the first fixing portion 15 is hooked with the concave portion 330e, being brought into contact with the internal face 330e1 of the concave 330e.

Further, in the embodiment illustrated in FIG. 11, the first fixing portion 15 and the concave portion 330e are hooked with each other in a state that a tip end face 15e of the fixing portion 15 also contacts the internal face 330e1 of the concave portion 330e. In addition, the upper face 15c contacts the upper edge 330e2.

As a result, the slider 330 is firmly fixed to the holding portion 14 in a state of being positioned by both the tip end 15b of the first fixing portion 15 and the upper face 15c.

Thus, the slider 330 is configured to have the above structure, whereby the slider 330 is positioned securely to be firmly fixed to the flexure 111.

Further, when the slider 330 is in a state of being held by the flexure 111, there are two states. One state is that the tip end 15b of the first fixing portion 15 is hooked with the concave portion 330e by contacting the internal face 330e1 thereof. The other state is that the upper face 15c of the first fixing portion 15 contacts the upper edge 330e2 of the concave portion 330e. Either one of the aforementioned two states is sufficient for the slider 330 to be positioned securely to be firmly fixed to the flexure 111. However, it is more preferable that both the aforementioned two states are simultaneously applied thereto, because the slider 330 can be further securely positioned to be firmly fixed to the flexure 111.

In the slider 230, shown in FIG. 8, or the slider 330, shown in FIG. 10, the concave portions 230e or 330e is formed on the leading-side end faces 230a or 330a, respectively.

Figure 12:
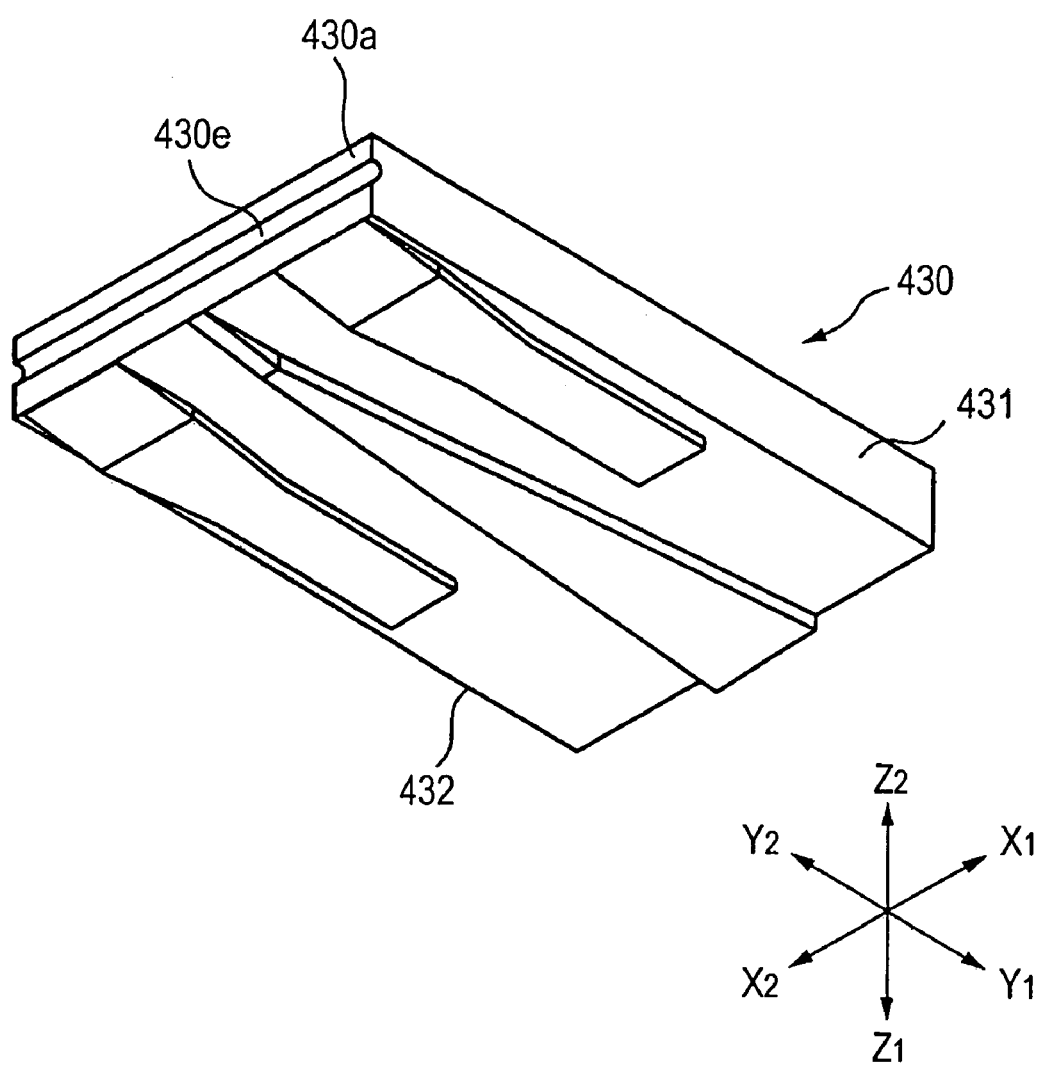
FIG. 12 is a perspective view illustrating another embodiment of the slider supported by the supporting member of FIG. 1, looking from the leading side.
Figure 14:
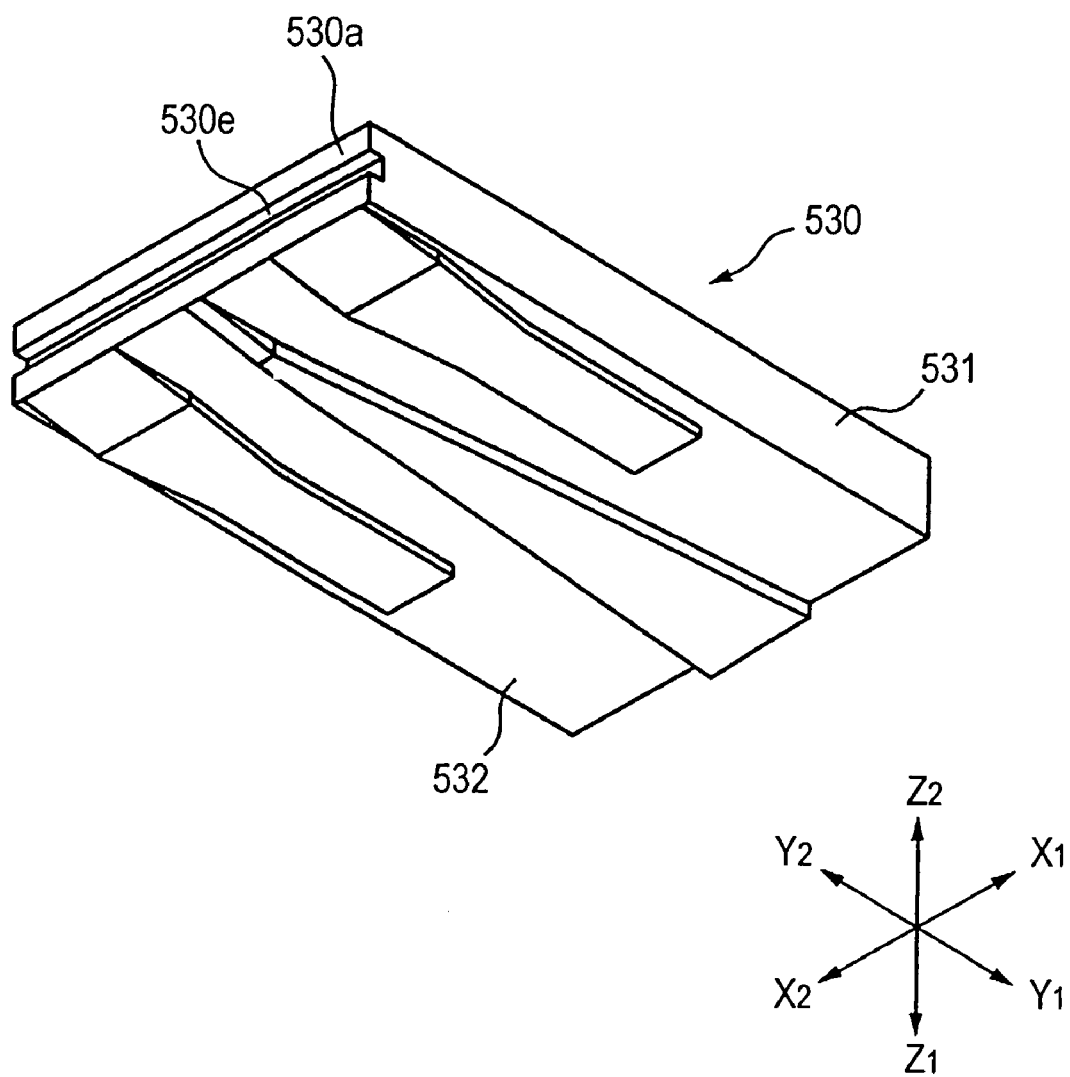
FIG. 14 is a perspective view illustrating another embodiment of the slider supported by the supporting member of FIG. 1, looking from the leading side.

However, sliders 430 or 530 provided with concave grooves 430e or 530e may be formed instead of the concave portions 230e or 330e, as shown in FIG. 12 or 14, respectively. In the sliders 430 and 530, shown in FIGS. 12 and 14, the concave grooves 430e or 530e serves as a hooking device for hooking the sliders 430 or 530 with the flexure 111, respectively.

In the slider 430, shown in FIG. 12, the concave groove 430e is formed on the leading-side end face 430a. The concave groove 430e is consecutively formed from one side-face 431 of the slider 430 to the other side-face 432 thereof.

The difference of the concave groove 430e from the concave portion 230e formed on the slider 230, shown in FIG. 8 or the concave portion 330e formed on the slider 330, shown in FIG. 10, respectively, is that, while the concave groove 430e is consecutively formed from one side-face 431 to the other side-face 432, the concave portion 230e or 330e is not consecutively formed from one side-face 231 to the other side-face 232, or one side-face 331 to the other side-face 332, respectively, but is formed at the leading-side end face 230a or 330a in the sliders 230 or 330, being positioned inside between one side-face 231 and the other side-face 232, or one side-face 331 and the other side-face 332, shown in FIGS. 8 and 10, respectively.

Figure 13:
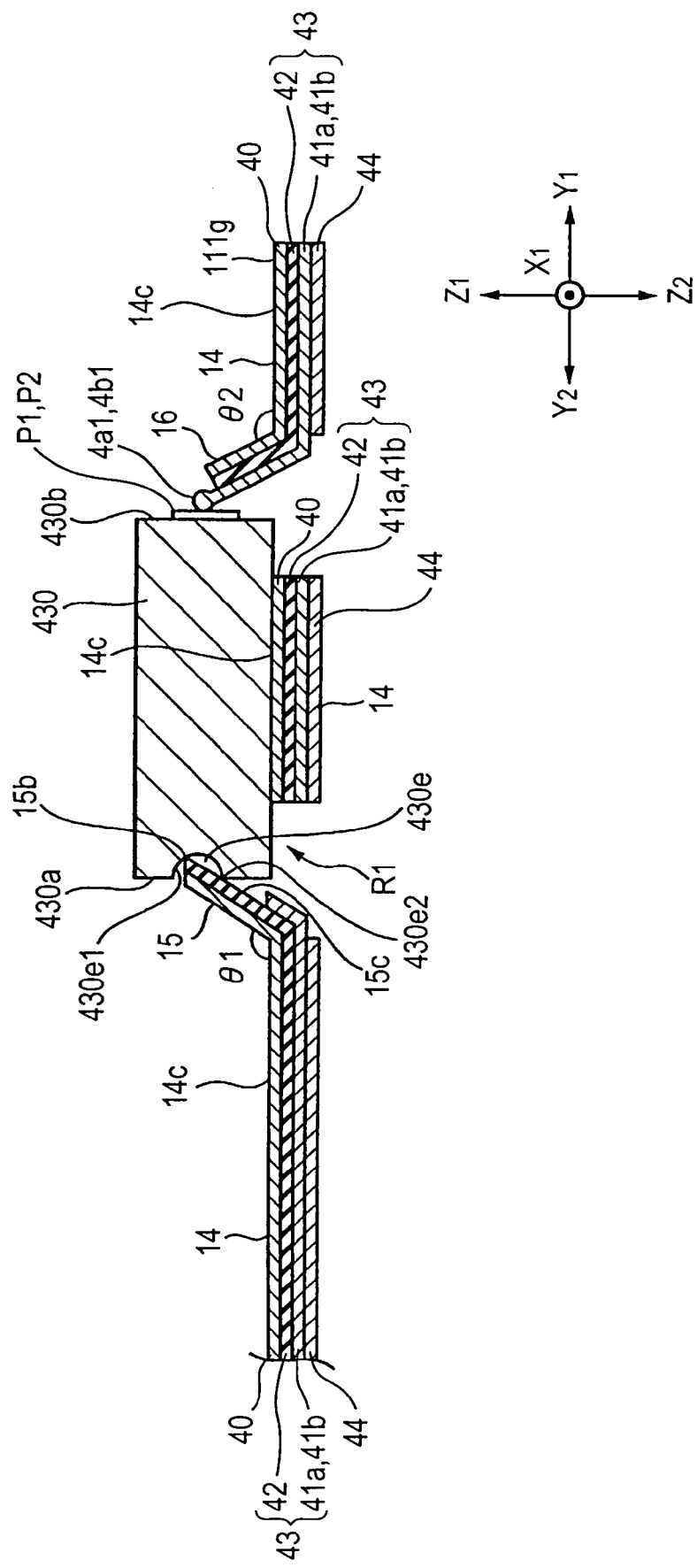
FIG. 13 is a partial cross-section illustrating the slider of FIG. 12 being held by the supporting member of FIG. 1.

FIG. 13 is a cross-section illustrating the slider 430 in a state of being sandwiched between the first fixing portion 15 and the second fixing portion 16 formed on the flexure 111, and held by the holding portion 14 within the area R1 in the flexure 111. Incidentally, the flexure 111 in FIG. 13 is the same as that illustrated in FIG. 7, and thus, a same reference numeral is applied in FIG. 13 and an explanation thereof will be omitted.

As illustrated in FIG. 13, the internal face 430e1 of the concave groove 430e has a semicircular shape being caved in a direction toward a trailing-side end face 430b of the slider 430.

As illustrated in FIG. 13, when the slider 430 is in a state of being fixed to the flexure 111, the tip end 15b of the first fixing portion 15 is positioned in the concave groove 430e. In addition, the tip end 15b of the first fixing portion 15 is hooked with the concave groove 430e in a state of contacting the internal face 430e1 of the concave groove 430e. Further, the upper face 15c of the first fixing portion 15 contacts an upper edge 430e2 of the concave groove 430e.

Therefore, the slider 430 is fixed to the holding portion 14 in a state of being positioned by both the tip end 15b of the first fixing portion 15 and the upper face 15c.

Thus, the slider 430 is configured to have the above structure, whereby the slider 430 is positioned securely to be firmly fixed to the flexure 111.

Further, when the slider 430 is in a state of being held by the flexure 111, there are two states. One state is that the tip end 15b of the first fixing portion 15 is hooked with the concave portion 430e by contacting the internal face 430e1 thereof. The other state is that the upper face 15c of the first fixing portion 15 contacts the upper edge 430e2 of the concave portion 430e. Either one of the aforementioned two states is sufficient for the slider 430 to be positioned securely to be firmly fixed to the flexure 111. However, it is more preferable that both the aforementioned two states are simultaneously applied thereto, because the slider 430 can be further securely positioned to be firmly fixed to the flexure 111.

In the slider 530, shown in FIG. 14, the concave groove 530e is formed on the leading-side end face 530a. The concave groove 530e is consecutively formed from one side-face 531 of the slider 430 to the other side-face 532 thereof.

The difference of the concave groove 530e from the concave portion 230e formed on the slider 230, shown in FIG. 8 or the concave portion 330e formed on the slider 330, shown in FIG. 10, is that, while the concave groove 530e is consecutively formed from one side-face 531 to the other side-face 532, the concave portions 230e or 330e is not consecutively formed from one side-face 231 to the other side-face 232, or one side-face 331 to the other side-face 332 of the sliders 230 or 330, respectively, but is formed at the leading-side end face 230a or 330a, being positioned inside between one side-face 231 and the other side-face 232, or one side-face 331 and the other side-face 332 in the sliders 230 or 330, shown in FIG. 8 or 10, respectively.

Figure 15:
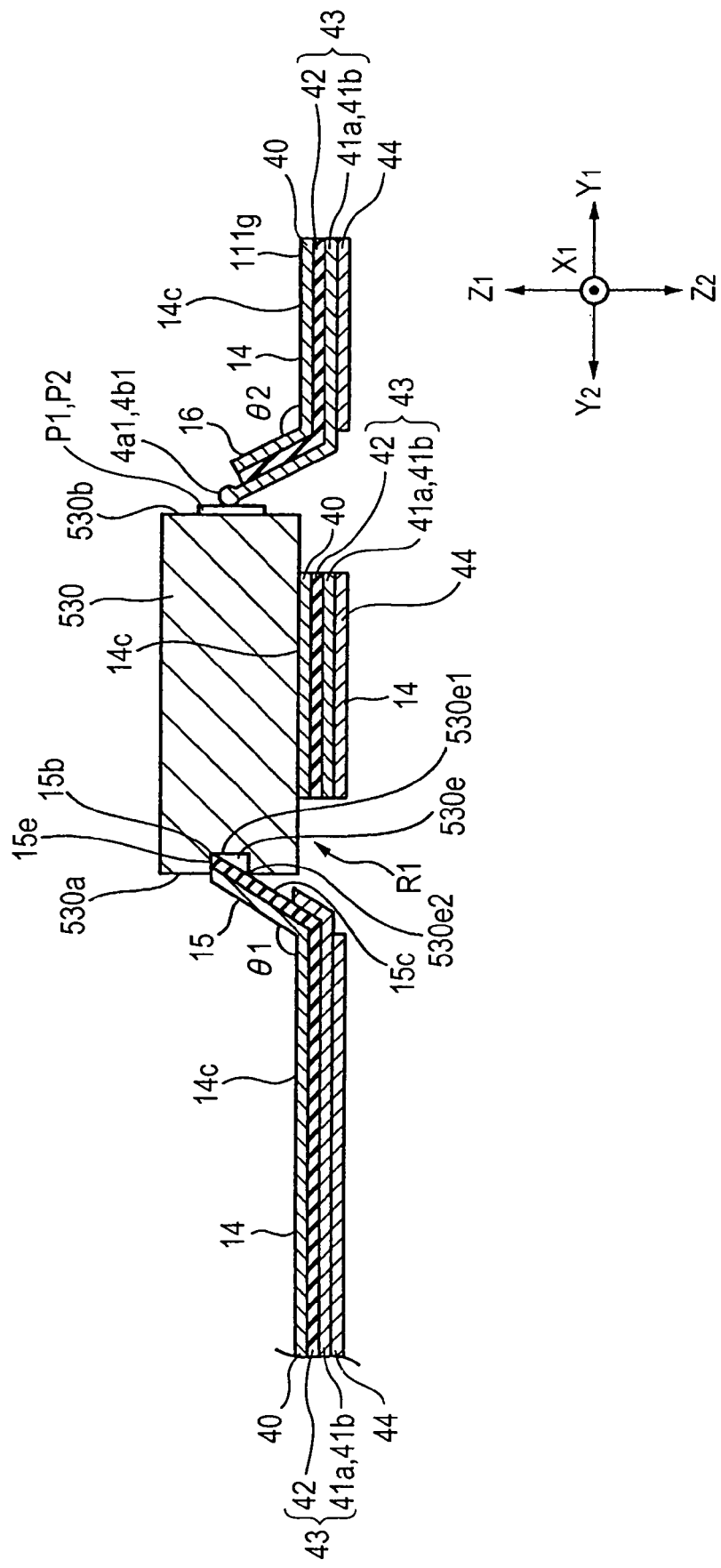
FIG. 15 is a partial cross-section illustrating the slider of FIG. 14 being held by the supporting member of FIG. 1.

FIG. 15 is a cross-section illustrating the slider 530 in a state of being sandwiched between the first fixing portion 15 and the second fixing portion 16 formed on the flexure 111, and held by the holding portion 14 within the area R1 in the flexure 111. Incidentally, the flexure 111 in FIG. 15 is the same as that illustrated in FIG. 7, and thus, a same reference numeral is applied in FIG. 15 and an explanation thereof will be omitted.

As illustrated in FIG. 15, the internal face 530e1 of the concave groove 530e has a semicircular shape being caved in a direction toward a trailing-side end face 530b of the slider 530.

As illustrated in FIG. 15, when the slider 530 is in a state of being fixed by the flexure 111, the tip end 15b of the first fixing portion 15 is positioned in the concave groove 530e. In addition, the tip end 15b of the first fixing portion 15 is hooked with the concave groove 530e in a state of contacting the internal face 530e1 of the concave groove 530e.

Incidentally, in the embodiment illustrated in FIG. 15, the first fixing portion 15 and the concave groove 530e are hooked with each other in a state that the tip end face 15e of the first fixing portion 15 also contacts the internal face 530e1 of the concave groove 530e. In addition, the upper face 15c of the first fixing potion 15 contacts the upper edge 530e2 of the concave groove 530e.

Therefore, the slider 530 is fixed to the holding portion 14 in a state of being positioned by both the tip end 15b of the first fixing portion 15 and the upper face 15c.

Thus, the slider 530 is configured to have the above structure, whereby the slider 530 is positioned securely to be firmly fixed to the flexure 111.

Further, when the slider 530 is in a state of being held by the flexure 111, there are two states. One state is that the tip end 15b of the first fixing portion 15 is hooked with the concave portion 530e by contacting the internal face 530e1 thereof. The other state is that the upper face 15c of the first fixing portion 15 contacts the upper edge 530e2 of the concave portion 530e. Either one of the aforementioned two states is sufficient for the slider 530 to be positioned securely to be firmly fixed to the flexure 111. However, it is more preferable that both the aforementioned two states are simultaneously applied thereto, because the slider 530 can be further securely positioned to be firmly fixed to the flexure 111.

When the concave portions 230e or 330e is replaced by the concave grooves 430e or 530e, a hooking device for hooking the sliders 430 or 530, respectively, with the flexure 111 can be easily formed.

Figure 16:
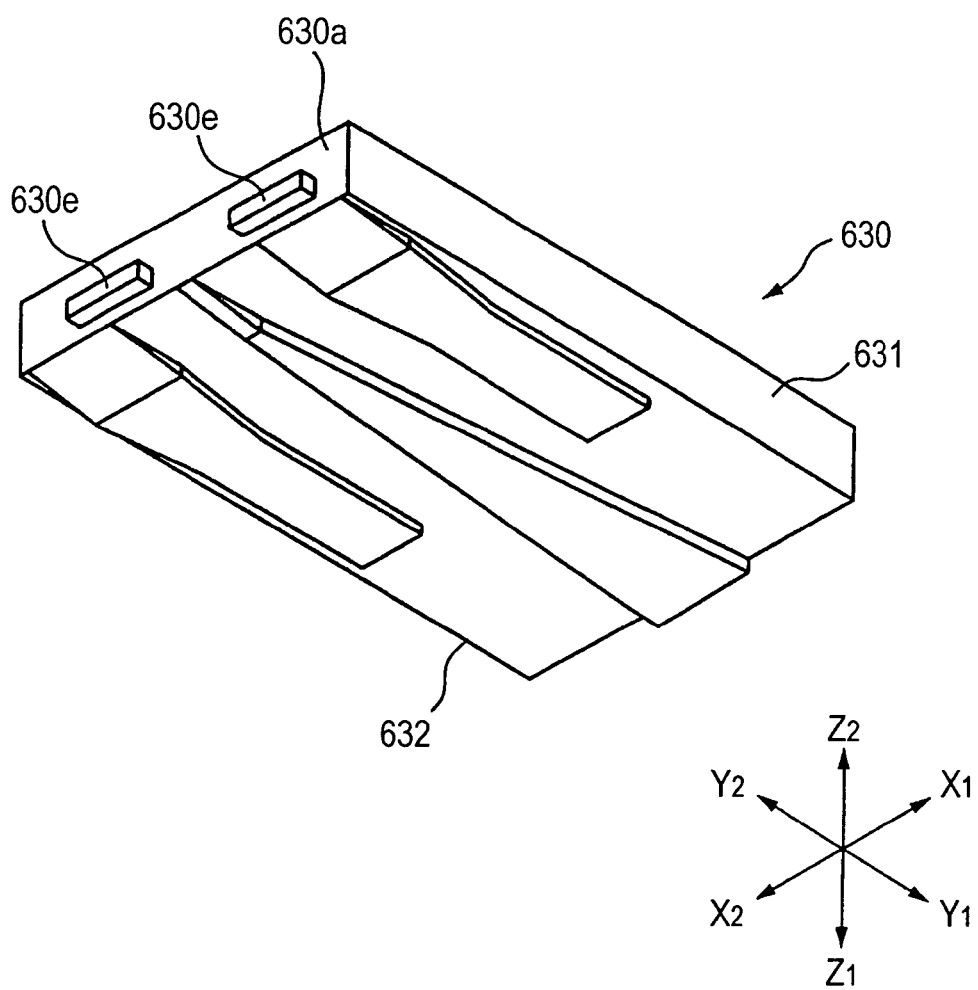
FIG. 16 is a perspective view illustrating another embodiment of the slider supported by the supporting member of FIG. 1, looking from the leading side.

FIG. 16 is a perspective view illustrating another embodiment of a slider 630 supported by the supporting member 110 of the present invention.

The slider 630, shown in FIG. 16 is made of the same material as the slider 30, shown in FIG. 4, and is composed of the same constituent parts as that of the slider 30, shown in FIG. 4. Accordingly, a different part of the slider 630 from the slider 30, shown in FIG. 4 will be mainly explained below.

The difference between the slider 630 shown in FIG. 16 and the slider 30 is that a protruding portion 630e serving as a hooking device for hooking the slider 630 with the flexure 111 is formed on a leading-side end face 630a, as shown in FIG. 16. In the embodiment, illustrated in FIG. 16, two protruding portions 630e are formed on the leading-side end face 630a.

As illustrated in FIG. 16, the protruding portion 630e is formed on the leading-side end face 630a being positioned inside between one side-face 631 and the other side-face 632.

Figure 17:
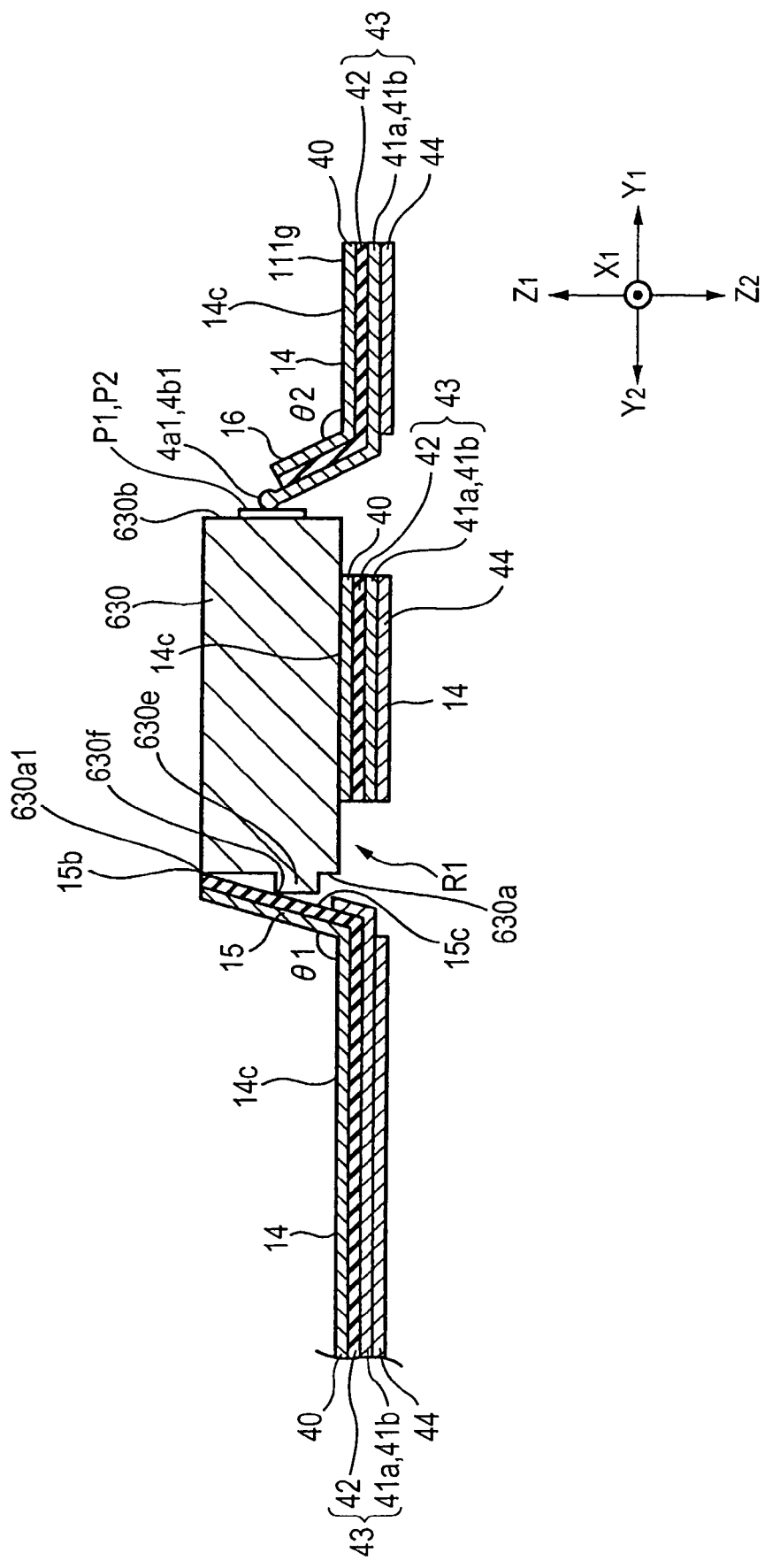
FIG. 17 is a partial cross-section illustrating the slider of FIG. 15 being held by the supporting member of FIG. 1.

FIG. 17 is a partial cross-section illustrating the slider 630 in a state of being sandwiched between the first fixing portion 15 and the second fixing portion 16 formed on the flexure 111, and held by the holding portion 14 within the area R1 in the flexure 111, and is a cross-section corresponding to FIG. 7, illustrating the slider 30 of FIG. 4, in a state of being fixed by the flexure 111. Incidentally, the flexure 111 in FIG. 17 is the same as that illustrated in FIG. 7, and thus, a same reference numeral is applied in FIG. 17 and an explanation thereof will be omitted.

As illustrated in FIGS. 16 and 17, the protruding portion 630e is formed such that the protruding portion 630e is protruding toward outside, namely, in a direction opposite to that of a trailing-side end face 630b (in a direction indicated by an arrow Y2) from the leading-side end face 630a. In the embodiment, shown in FIGS. 16 and 17, although the protruding portion 630e has a shape of a rectangular parallelepiped, the protruding portion 630e may be formed in other shapes.

As illustrated in FIG. 17, when the slider 630 is in a state of being fixed to the flexure 111, the tip end 15b of the first fixing portion 15 contacts the leading-side end face 630a, and more in detail, the tip end 15b of the first fixing portion 15 contacts a lower edge 630a1 of the leading-side end face 630a in the embodiment, shown in FIG. 17. However, the tip end 15b of the first fixing portion 15 may contact the leading-side end face 630a being positioned at a side upper than the lower edge 630a1 of the leading-side end face 630a (in a direction indicated by an arrow Z2).

In addition, the upper face 15c of the first fixing portion 15 contacts a lower edge 630f of the protruding portion 630e.

In the slider 630, the tip end 15b of the first fixing portion 15 contacts the leading-side end face 630a and at the same time, the upper face 15c of the first fixing portion 15 also contacts the lower edge 630f. Accordingly, the slider 630 is positioned securely to be firmly fixed to the flexure 111.

Figure 18:
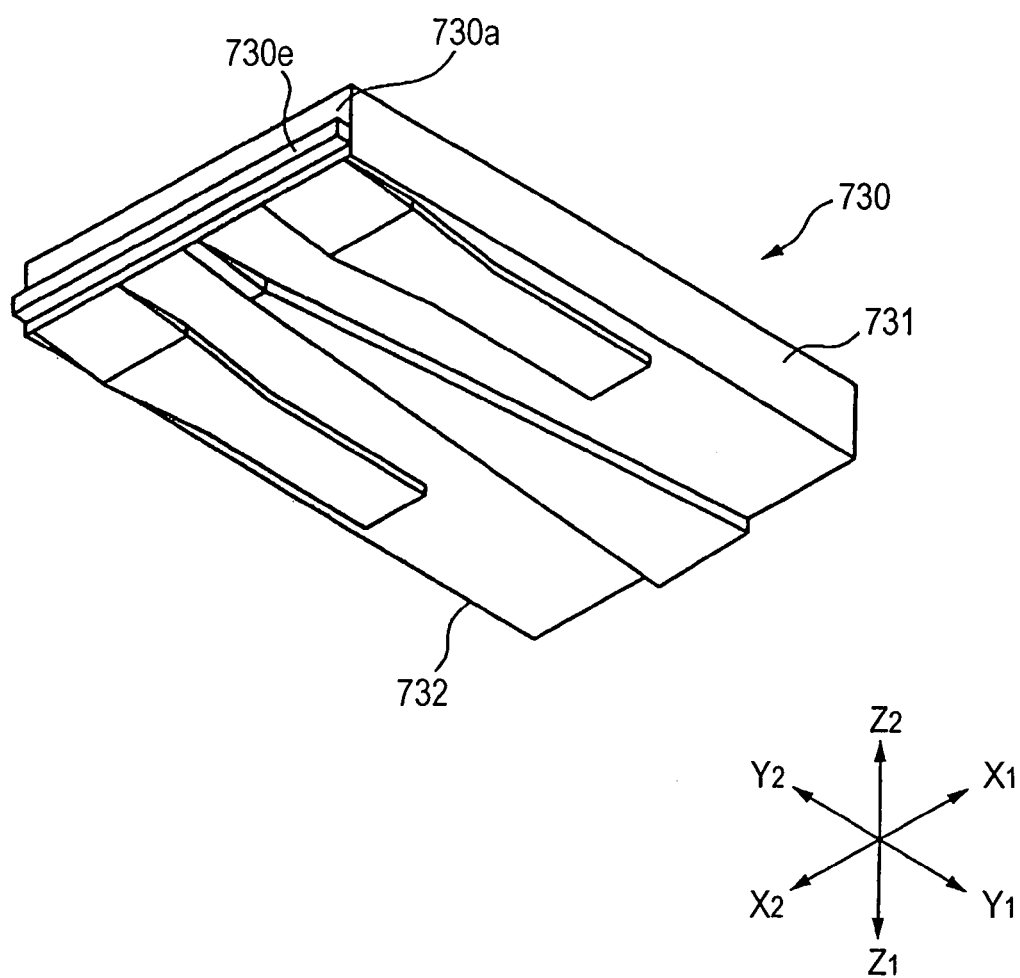
FIG. 18 is a perspective view illustrating another embodiment of the slider supported by the supporting member of FIG. 1, looking from the leading side.

FIG. 18 is a perspective view illustrating another embodiment of the slider supported by the supporting member 110 of FIG. 1, looking from the leading-side.

The difference of a slider 730, shown in FIG. 18, is made of the same material as the slider 30, shown in FIG. 4, and is composed of the same constituent parts as that of the slider 30 illustrated in FIG. 4. Accordingly, a different part of the slider 70 from the slider 30, shown in FIG. 4, will be mainly explained below.

The difference of the slider 730 from the slider 30, shown in FIG. 4, is that a protruding ridge 730e that serves as a hooking device for hooking the slider 730 with the flexure 111 is formed on a leading-side end face 730a, as illustrated in FIG. 18. In the embodiment illustrated in FIG. 18, the protruding ridge 730e is formed at the leading-side end face 730a.

The protruding ridge 730e is consecutively formed from one side-face 731 to the other side-face 732 of the slider 730.

The difference of the protruding ridge 730e formed on the slider 730, shown in FIG. 18, from the protruding portion 630e formed on the slider 630, shown in FIG. 16, is that, while the protruding ridge 730e is consecutively formed from one side-face 731 to the other side-face 732, the protruding potion 630e formed on the slider 630 is not consecutively formed from one side-face 631 to the other side-face 632, but is formed at the leading-side end face 631a, being positioned inside between one side-face 631 and the other side-face 632, in the slider 630, shown in FIG. 16.

FIG. 19 is a partial cross-section illustrating the slider 730 in a state of being sandwiched between the first fixing portion 15 and the second fixing portion 16 formed on the flexure 111, and held by the holding portion 14 within the area R1 in the flexure 111, and is a cross-section corresponding to FIG. 7, illustrating the slider 30 of FIG. 4, in a state of being fixed by the flexure 111. Incidentally, the flexure 111 in FIG. 19 is the same as that illustrated in FIG. 7, and thus, a same reference numeral is applied in FIG. 19 and an explanation thereof will be omitted.

As illustrated in FIGS. 18 and 19, the protruding ridge 730e is formed such that the same is protruding toward outside, namely, in a direction opposite to that of a trailing-side end face 730b (in a direction indicated by an arrow Y2) from the leading-side end face 730a. In the embodiment, shown in FIGS. 18 and 19, although the protruding ridge 730e has a shape of a rectangular parallelepiped, the protruding ridge 730e may be formed in other shapes.

As illustrated in FIG. 19, when the slider 730 is in a state of being fixed to the flexure 111, the tip end 15b of the first fixing portion 15 contacts the leading-side end face 730a, and more in detail, the tip end 15b of the first fixing portion 15 contacts a lower edge 730a1 of the leading-side end face 730a in the embodiment, shown in FIG. 19. However, the tip end 15b of the first fixing portion 15 may contact the leading-side end face 730a being positioned at a side upper than the lower edge 730a1 of the leading-side end face 730a (in a direction indicated by an arrow Z2).

In addition, the upper face 15c of the first fixing portion 15 contacts a lower edge 730f of the protruding ridge 730e.

In the slider 730, the tip end 15b of the first fixing portion 15 contacts the leading-side end face 730a and at the same time, the upper face 15c of the first fixing portion 15 also contacts the lower edge 730f. Accordingly, the slider 730 is positioned securely to be firmly fixed to the flexure 111.

The above-described concave portions 230e and 330e, the concave grooves 430e and 530e, the protruding portion 630e, and the protruding ridge 730e can be formed on the leading-side end faces 230a, 330a, 430a, 530a, 630a, and 730a of the sliders 230, 330, 430, 530, 630, and 730, respectively, by performing machine works such as polishing or the like using a grinding stone or the like, or a laser process.

Incidentally, there is no need to say that the sliders 230, 330, 430, 530, 630 and 730 can be treated as a test object of the testing apparatus using the supporting member 110 and can constitute a magnetic element apparatus capable of being mounted on hardware, as the slider 30 can be.

Further, the formation of the concave portions 230e or 330e, the concave grooves 430e or 530e, the protruding portion 630e, or the protruding ridge 730e that functions as a hooking device for hooking the sliders 30, 230, 430, 530, or 630 with the flexure 111 is not limited to that, shown in FIGS. 8 through 19, but other formation may be applicable when the first fixing portion 15 can be hooked with the concave portions 230e or 330e, the concave grooves 430e or 530e, the protruding portion 630e or the protruding ridge 730e.

Furthermore the number of the first fixing portion 15 and the second fixing portion 16 is not limited to that in the present invention.

Moreover, although each of the concave portion 230e in FIG. 8, the concave portion 330e in FIG. 10, and the protruding portion 630e in FIG. 16 is provided two in number, the number of the concave portions 230e and 330e, and the protruding portion 630e is not limited to that in the present invention and one or more than two thereof in number may be applicable. However, it is preferable that the concave portions 230e or 330e, or the protruding portion 630e is formed in number corresponding to the number of the first fixing portion 15 and each of the concave portions 230e or 330e, or the protruding portion 630e is hooked with each of the first fixing portion 15.

In addition, in the explanation described above, two fixing portions of the first fixing portion 15 and the second fixing portion 16 are formed on the holding portion 14 as an embodiment. However, the present invention is not limited to the embodiment mentioned above, and the fixing portion may be formed more than two in number. In this case, the slider 30 is mounted between respective fixing portions and is sandwiched therebetween.

What is claimed is:

1. A slider supporting member for supporting a slider in a floating condition above a recording medium comprising:
   a first supporting portion; and
   a second supporting portion fixed to the first supporting portion,
   wherein a conductive pattern is formed in the second supporting portion, the conductive pattern being disposed on a thin leaf spring having elasticity with an insulating layer therebetween, and the second supporting portion includes a holding portion for holding a slider having magnetic elements for at least one of recording or replaying,
   wherein a plurality of fixing portions are formed in the holding portion both on a side facing towards terminal portions of the slider and on the opposite side facing towards terminal portions of the slider, each of the fixing portions being gradually inclined in a direction closer to the slider from a surface of the holding portion towards a side facing a recording medium and from base end portions of the fixing portions towards tip end portions of the fixing portions,
   wherein tip end portions of the conductive patterns are exposed from tip ends of the fixing portions located on the side facing towards terminal portions of the slider, and
   wherein when the slider is sandwiched between the plurality of fixing portions, the slider is held in the holding portion by a elastic pressing force caused by elasticity of the fixing portions and the slider is electrically connected to the conductive pattern by contacting the terminal portions of the slider with the tip end portions of the conductive patterns exposed from the tip end portions of the fixing portions.

2. The slider supporting member according to claim 1, wherein the fixing portions located on the side facing towards the terminal portions of the slider serve as positioning portions for positioning the slider.

3. The slider supporting member according to claim 1, wherein the fixing portion is formed of a notched piece formed at the holding portion.

4. The slider supporting member according to claim 1, wherein the fixing portions located on the side facing towards terminal portions of the slider are inclined to rise up at a predetermined angle from a surface of the holding portions towards the side facing a recording medium.

5. The slider supporting member according to claim 1, wherein the slider is detachably held by the holding portion.

6. The slider supporting member according to claim 1, wherein the slider is bonded with the holding portion in a state of being held by the holding portion.

7. The slider supporting member according to claim 1, wherein a hooking device capable of being hooked with the first fixing portion is formed at a leading-side end face of the slider, and wherein the slider is held by the holding portion, and wherein the hooking device and the first fixing portion are in a state of being hooked each other.

8. The slider supporting member according to claim 7, wherein the hooking device is caved in a direction toward a trailing-side end face and serves as a concave portion positioned between both side-faces of the slider.

9. The slider supporting member according to claim 7, wherein the hooking device is caved in a direction toward a trailing-side end face and serves as a concave groove consecutively formed from one side-face to the other side-face of the slider.

10. The slider supporting member according to claim 7, wherein the hooking device is protruded in a direction opposite to the trailing-side end face of the slider and serves as a protruding portion positioned between both side-faces of the slider.

11. The slider supporting member according to claim 7, wherein the hooking device is protruded in a direction opposite to the trailing-side end face of the slider and serves as a protruding ridge consecutively formed from one side-face to the other side-face.

12. The slider supporting member according to claim 1, wherein the insulating layers contact with the slider at fixing portions other than the fixing portions located on a side facing towards terminal portions of the slider.

13. The slider supporting member according to claim 1, wherein the conductive patterns are disposed on the thin leaf spring on a side opposite to a face that faces towards the recording medium.

14. A method for testing dynamic-characteristics evaluation test for a slider, comprising the steps of:
   scanning a recording medium with a slider using a slider supporting member for supporting a slider in a floating condition above the recording medium, including:
   a first supporting portion; and
   a second supporting portion fixed to the first supporting portion,
   wherein a conductive pattern is formed in the second supporting portion, the conductive pattern being disposed on a thin leaf spring having elasticity with an insulating layer therebetween, and the second supporting portion includes a holding portion for holding the slider having magnetic elements for at least one of recoding or replaying, wherein a plurality of fixing portions are formed in the holding portion both on a side facing towards terminal portions of the slider and on the opposite side facing towards terminal portions of the slider, each of the fixing portions being gradually inclined in a direction closer to the slider from a surface of the holding portion towards a side facing a recording medium and from base end portions of the fixing portions towards tip end portions of the fixing portions, wherein tip end portions of the conductive patterns are exposed from tip ends of the fixing portions located on the side facing towards terminal portions of the slider, and wherein when the slider is sandwiched between the plurality of fixing portions, the slider is held in the holding portion by a elastic pressing force caused by elasticity of the fixing portions and the slider is electrically connected to the conductive pattern by contacting the terminal portions of the slider with the tip end portions of the conductive patterns exposed from the tip end portions of the fixing portions.

15. The method according to claim 14, further comprising the steps of: holding the slider having the magnetic element for recording in the holding portion.

16. The slider supporting member according to claim 14, wherein the fixing portions located on the side facing towards terminal portions of the slider are inclined to rise up at a predetermined angle from a surface of the holding portions towards the side facing a recording medium.

17. The slider supporting member according to claim 14, wherein the fixing portions located on the side facing towards the terminal portions of the slider serve as positioning portions for positioning the slider.

* * * * *